(12) United States Patent
Damask

(10) Patent No.: US 6,867,918 B2
(45) Date of Patent: Mar. 15, 2005

(54) METHODS AND APPARATUS FOR GENERATION AND CONTROL OF COHERENT POLARIZATION MODE DISPERSION

(76) Inventor: Jay N. Damask, 923 King James Landing Rd., #10, Annapolis, MD (US) 21403

(*) Notice: Subject to any disclaimer, the term of this patent is extended or adjusted under 35 U.S.C. 154(b) by 257 days.

(21) Appl. No.: 10/013,596

(22) Filed: Dec. 7, 2001

(65) Prior Publication Data

US 2002/0118455 A1 Aug. 29, 2002

Related U.S. Application Data

(60) Provisional application No. 60/259,913, filed on Jan. 5, 2001, provisional application No. 60/275,914, filed on Mar. 15, 2001, and provisional application No. 60/251,765, filed on Dec. 7, 2000.

(51) Int. Cl.[7] .............................................. G02B 27/28
(52) U.S. Cl. ....................... 359/497; 359/499; 398/152; 398/159; 398/161
(58) Field of Search ................................. 359/497, 499; 398/158, 159, 161, 147, 152

(56) References Cited

U.S. PATENT DOCUMENTS

| | | | |
|---|---|---|---|
| 4,341,442 A | 7/1982 | Johnson ................... 385/11 |
| 5,430,795 A | 7/1995 | Taga et al. ................ 359/179 |
| 5,473,457 A | 12/1995 | Ono ......................... 359/161 |
| 5,587,827 A | 12/1996 | Hakimi et al. ........... 359/249 |
| 5,600,738 A | 2/1997 | Bergland et al. ........ 385/11 |
| 5,659,412 A | 8/1997 | Hakki ....................... 359/156 |
| 5,793,511 A | 8/1998 | Bulow ...................... 359/161 |
| 5,796,510 A | 8/1998 | Yao .......................... 359/256 |
| 5,822,100 A | 10/1998 | Robinson et al. ....... 359/161 |
| 5,859,939 A | 1/1999 | Fee et al. ................. 385/24 |
| 5,930,414 A | 7/1999 | Fishman et al. ......... 385/11 |
| 5,978,125 A | 11/1999 | Yao .......................... 359/256 |
| 6,011,253 A | 1/2000 | Hakki ....................... 250/225 |
| 6,104,515 A | 8/2000 | Cao .......................... 359/161 |
| 6,130,766 A | 10/2000 | Cao .......................... 359/161 |
| 6,271,952 B1 | 8/2001 | Epworth ................... 359/161 |
| 6,282,333 B1 | 8/2001 | Dultz et al. .............. 385/11 |
| 6,631,221 B2 * | 10/2003 | Penninckx et al. ...... 385/11 |
| 2001/0024538 A1 * | 9/2001 | Khosravani et al. .... 385/11 |
| 2002/0015547 A1 * | 2/2002 | Patel ........................ 385/11 |
| 2002/0080467 A1 * | 6/2002 | Damask .................... 359/301 |

FOREIGN PATENT DOCUMENTS

| | | |
|---|---|---|
| WO | WO 99/53363 A2 | 10/1999 |
| WO | WO 00/03505 A1 | 1/2000 |
| WO | WO 00/13056 A2 | 3/2000 |
| WO | WO 00/36459 A1 | 6/2000 |
| WO | WO 00/65404 A1 | 11/2000 |
| WO | WO 01/40831 | 6/2001 |
| WO | WO 01/48957 | 7/2001 |
| WO | WO 01/61303 | 8/2001 |
| WO | WO 01/61385 | 8/2001 |

OTHER PUBLICATIONS

60/168205.*
60/172346.*
60/174807.*
Betti et al., "Phase Noise and Polarization State Insensitive Optical Coherent Systems," Journal of Lightwave Tech., vol. 8, No. 5, at 756–76 (May 1990).

(List continued on next page.)

*Primary Examiner*—Mark A. Robinson
*Assistant Examiner*—Lee Fineman
(74) *Attorney, Agent, or Firm*—Brett Alten

(57) ABSTRACT

Methods and apparatus for coherent PMD generation are provided. A PMD generator can include at least four birefringent stages in optical series, thereby forming at least three pairs of adjacent stages. Each of the stages includes a harmonic differential group delay element and a phase-compensating element. The generator can be made colorless (i.e., made to have the same PMD at each WDM channel) and can be operated such that DGD and second order PMD can be independently generated and controlled. These PMD generators can be used in PMD compensators and PMD emulators.

76 Claims, 29 Drawing Sheets

OTHER PUBLICATIONS

Bulow, "Operation of Digital Optical Transmission System with Minimal Degradation Due to Polarisation Mode Dispersion," Electronics Letters, vol. 31, No. 3, at 214–15, (Feb. 2, 1995).

Bulow, "Limitation of Optical First–Order PMD Compensation," OFC/IOOC '99 Technical Digest, vol. 2, at 74–76 (Feb. 1999).

Bulow et al., "PMD Mitigation at 10Gbits/s Using Linear and Nonlinear Integrated Electronics Equalizer Circuits," Electronic Letters, vol. 36, No. 2, at 163–64, (Jan. 20, 2001).

Bulow et al., "Electronic Equalization of Fiber PMD–Induced Distortion at 10Gbits/s" OFC '98 Technical Digest, at 151–52, (Feb. 1998).

Cariali et al., "Electronic Compensation of PMD and Chromatic Dispersion with an IC in Gbits/s Transmission System," Electronic Letters, vol. 36, No. 10 at 889–91, (May 11, 2000).

Chbat, "Mitigation of Polarization Mode Dispersion" LEOS '99, vol. 1, at 151–52 (Nov. 1999).

Chbat et al., "Long Term Field Demonstration of Optical PMD Compensation on an Installed OC–192 Link," OFC/IOOC '99 Technical Digest, vol. Suppliement, at 12–1/12–3, (Feb. 1999).

Chen, "System Impairment Due to Polarization Mode Dispersion," OFC/IOOC '99 Technical Digest, vol. 2, at 77–79, (Feb. 1999).

Chiba et al., "Polarization Stabilizer Using Liquid Crystal Rotatable Waveplates," Journal of Lightwave Technology, vol. 17, No. 5, at 885–890, (May 1999).

Chowdury et al., Measurement of Dispersion Compensating Module Polarization–Mode Dispersion Statistics, OFC '97, at 160–61, (1997).

Evans, "The Birefringent Filter," Journal of the Optical Society of America, vol. 39, No. 3, at 229–42 (Mar. 1949).

Fini et al., "Accumulation of Polarization–Mode Dispersion in Cascades of Compensated Optical Fibers," IEEE Photonics Technology Letters, vol. 13, No. 2, at 124–26, (Feb. 2001).

Gisin et al., "Polarization Mode Dispersion: Time Verses Frequency Domains," Optics Communications, vol. 89, Nos. 2, 3, 4 at 316–23 (May 1992).

Glingener et al., "Polarization Mode Dispersion Compensation at 20 Gb/s with a Compact Distributed Equalizer in LiNbO3," OFC/IOOC '99 Technical Digest, vol. Supplement, at PD29/1–PD29/3 (Feb. 1999).

Hakki, "Polarization Mode Dispersion Compensation By Phase Diversity Detection," IEEE Photonics Technology Letters, vol. 9, No. 1, at 121–23 (Jan. 1997).

Harris et al., "Optical Network Synthesis Using Birefringent Crystals. *I. Synthesis of Lossless Networks of Equal–Length Crystals," Journal of the Optical Society of America, vol. 54, No. 10, at 1267–79 (Oct. 1964).

Heismann, "Tutorial: Polarization Mode Dispersion: Fundamentals and Impact on Optical Communcations Systems," ECOC '98 vol. Supplement, at 51–79 (Sep. 1988).

Heismann et al., "Automatic Compensation of 1st Order Polarization Mode Dispersion in a 10 Gb/s Transmission System," ECOC '98, vol. 1 at 529–30 (Sep. 1998).

Hinz et al., "Polarization Mode Dispersion Compensation for 6ps, 40 Gbit/s Pulses Using Distributed Equalizer in LiNbO3," Electronics Letters, vol. 35, No. 14 at 1185–86 (Jul. 8, 1999).

Ishikawa et al., 40–Gbit/s Transmission Over High PMD Fiber with Automatic PMD Compensation, APCC/OECC '99, vol. 1 at 424–27 (Oct. 1999).

Kikuchi, "Anaysis of Signal Degree of Polarization Degradation Used as Control Signal for Optical PMDC," Journal of Lightwave Technology, vol. 19, No. 4, at 480–86 (Apr. 2001).

Kudou et al., "Theoretical Basis of Polarization Mode Dispersion Equalization Up to the 2nd Order," Journal of Lightwave Technology, vol. 18, No. 4, 614–17 (Apr. 2000).

Lee et al., Adjustable Compensation of Polarization Mode Dispersion Using a High–Birefrngence Nonlinearly Chirped Fiber Bragg Grating, IEEE Photonics Technology Letters, vol. 11, No. 10 at 1277–79 (Oct. 1999).

Mollar, "Filter Synthesis for Braodband PMD Compensation in WDM Systems," IEEE Photonics Technology Letters, vol. 12, No. 9 at 1258–60 (Sep. 2000).

Moller et al., "Spectral Resolved PMD Vector Monitoring Using a Scanning Fabry–Perot Filter and a Polarimeter," LEOS (Laser and Electro–Optics Society) '00—13th Annual/IEEE vol. 1, No. TuJ4 at 220–221 (Nov. 13–16, 2000).

Noe et al., "Polarization Mode Dispersion Compensation at 20 Gb/s with Fiber–Based Distribution Equalizer," http://ont.uni–paderborn.de/publikationen/ELPM9820.html,at 1–5 (viewed and printed Feb. 8, 2001).

Noe et al., "Fiber–Based Distribution PMD Compensation at 20 GB/s," ECOC '98, vol. 3 at 157–58 (Sep. 1998).

Noe et al., "Integrated Optical LiNbO3 Distributed Polarization Mode Dispersion Compensator in 20 Gbit/s Transmission System," Electronic Letters, vol. 35, No. 8 at 652–54 (Apr. 15, 1999).

Ozeki et al., "Polarization Mode Dispersion Equalization Experiment Using a Variable Equalizing Optical Circuit Controlled by a Pulse–Waveform Comparision Algorithm," OFC '94 Technical Digest at 62–64 (Nov. 4, 1994).

Patcher et al., "Component for 2nd Order Compensation of Polarization Mode Dispersion," Electronic Letters, vol. 33, No. 13 at 1157–59 (Jun. 19, 1997).

Pua et al., "An Adaptive 1st Order Polarization Mode Dispersion Compensation System Aided by Polarization Scrambling: Theory and Demostration," Journal of Lightwave Technology, vol. 18, No. 6 at 832–41 (Jun. 2000).

Roy et al., "A Simple Dynamic Polarization Mode Dispersion Compensator," OFC/IOOC '99 Technical Digest, vol. 1, at 275–78 (Feb. 1999).

Sandel et al., "Optical Polarization Mode Dispersion Compensation of 2.4 bit Durations of Differential Group Delay at 40 Gbit/s," Electronic Letetrs, vol. 35, No. 16 at 1365–67 (Aug. 5, 1999).

Sandel et al., "Automatic Polarisation Mode Dispersion Compensation in 40 Gbit/s Optical Transmission System," Electronics Letters, vol. 34, No. 23 at 2258–59 (Nov. 12, 1998).

Shtiaf et al., A Compensator for the Effects of High–Order Polarization Mode Disperison in Optical Fibers,: IEEE Photonics Technology Letters, vol. 12, No. 4 at 434–36 (Apr. 2000).

Sobiski et al., "Fast 1st Order PMD Compensation with Low Insertion Loss fo 10 Gbit/s System," Electronics Letters, vol. 37, No. 1 at 46–48 (Jan. 4, 2001).

Takahashi et al., "Automatic Compensation Techniques for Timewise Fluctuating Polarization Mode Dispersion in In–Line Amplifier Systems," Electronics Letters, vol. 30, No. 4 at 348–49 (Feb. 17, 1994).

Watley et al., "Field Evaluation of an Optical PMD Compensator Using an Installed 10 Gbit/s System," OCF '00, vol. 3, No. ThB6 at 37–39 (Mar. 2000).

Winters et al., "Experimental Equalization of Polarization Dispersion," IEEE Photonics Technology Letters, vol. 2, No. 8 at 591–93 (Aug. 1990).

Winters ry et al., "Adaptive Nonlinear Cancellation for High–Speed Fiber–Optic Systems," Journal of Lightwave Technology, vol. 10, No. 7 (Jul. 1992).

* cited by examiner

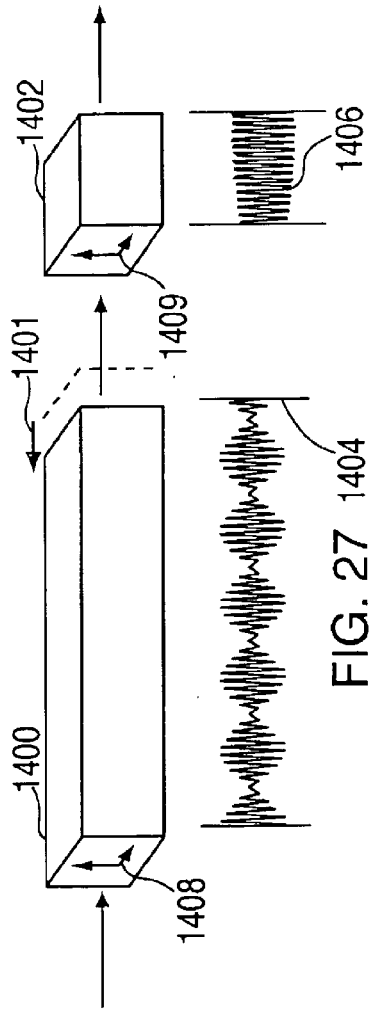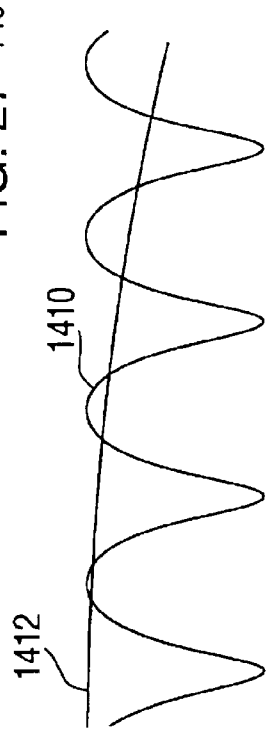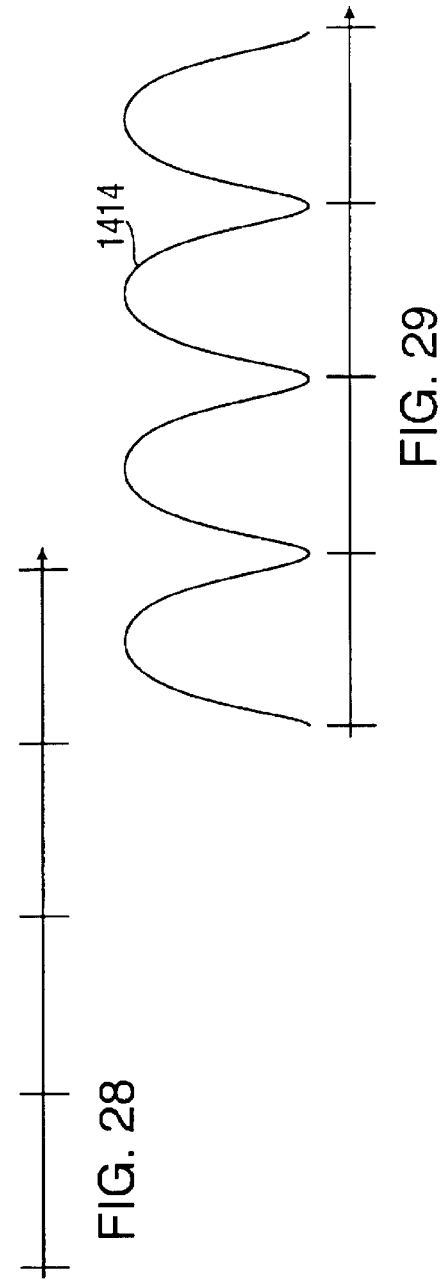
FIG. 27
FIG. 28
FIG. 29

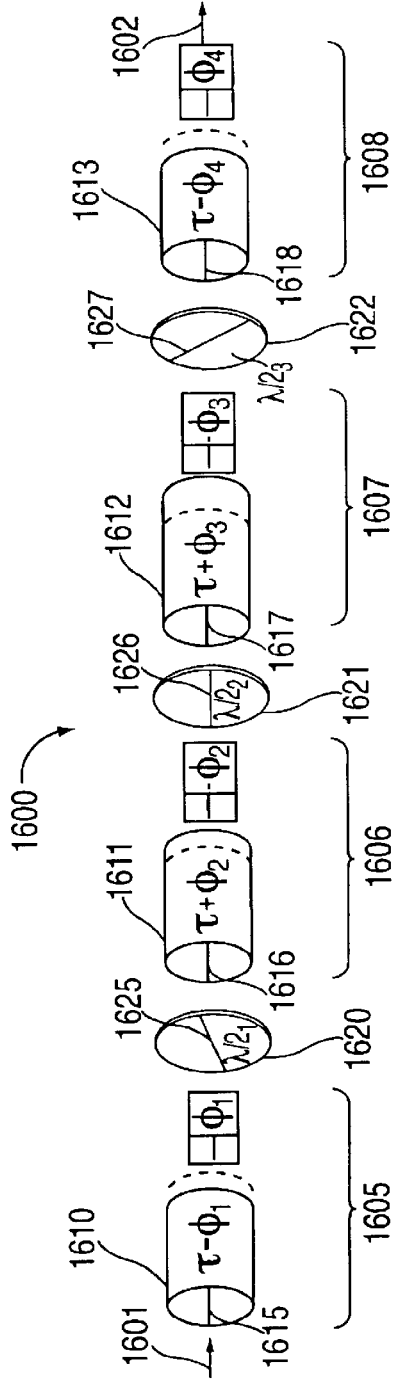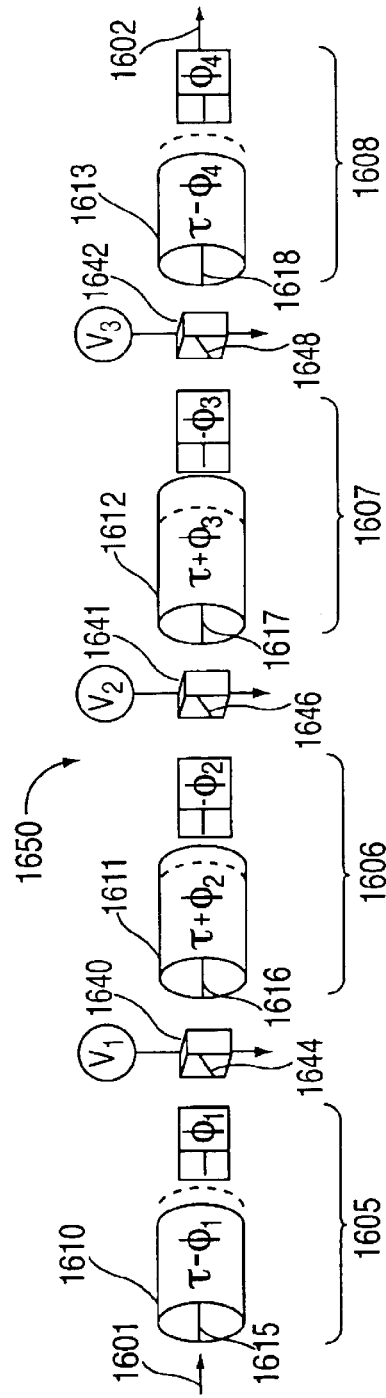

METHODS AND APPARATUS FOR GENERATION AND CONTROL OF COHERENT POLARIZATION MODE DISPERSION

CROSS-REFERENCE TO RELATED APPLICATIONS

This claims the benefit of U.S. Provisional Patent Application No. 60/251,765, filed Dec. 7, 2000, Application No. 60/259,913, filed Jan. 5, 2001, and Application No. 60/275,914, filed Mar. 15, 2001, and Patent Application No. which are hereby incorporated by reference herein in their entireties.

FIELD OF THE INVENTION

This invention relates to the generation of polarization mode dispersion, and more particularly to methods and apparatus for coherently generating polarization mode dispersion, aligning a coherent polarization mode dispersion spectrum to a wavelength-division multiplexed (hereinafter, "WDM") channel grid, and controlling generation of first and second order polarization mode dispersion across a WDM channel bandwidth.

BACKGROUND OF THE INVENTION

Polarization mode dispersion (hereinafter, "PMD") is an optical property that can be generated by a concatenation of two or more birefringent elements. PMD can be a significant impairment in high data-rate optical communication systems when the transmission medium is optical fiber. Data transmission rates that are effected by the PMD of optical fiber are typically 10 Gbps, 40 Gbps, and higher.

Optical fiber can exhibit PMD because of imperfections within the fiber, which induce localized birefringence. When the transmission path is long, these localized birefringent sections can combine to yield a particularly complicated polarization-dependent effect. These localized sections are known to result, for example, from eccentricities of the waveguide's core, micro-bubbles in the waveguide core and/or cladding, and strain gradients through the fiber cross-section. Mechanical stress on the fiber resulting from cabling and installation can also cause the fiber to suffer stress-induced birefringence. Environmental changes experienced by a fiber can be dynamic and statistical in nature, and are believed to result in PMD changes that can last for variable periods of time and vary with wavelength, with the potential for prolonged degradation of data transmission.

In the laboratory and the field, there are reasons to artificially generate PMD in a controlled fashion.

In the laboratory, for example, a PMD emulator is desirably used to predictably and repeatably add PMD to signals generated by optical transmitters for testing optical receivers. In many cases, however, the center frequency of the optical signal being tested may not be properly aligned with the PMD spectrum generated by the emulator. Because a conventional PMD emulator cannot controllably "frequency shift" its spectrum to accommodate for the misalignment, those attempting to evaluate the PMD response of receivers and other equipment are generally forced to test undesirable and unpredictable PMD states. Often, PMD emulators include ten or more birefringent sections.

A PMD generator can also be incorporated into a specialized telecommunications sub-system called a PMD compensator. PMD compensators are used to mitigate the deleterious effects of PMD imparted on an optical data signal transmitted through an optical fiber. In contrast to PMD emulators, PMD compensators generally include only one or two birefringent sections, but such a small number of sections greatly limits the range of achievable PMD states. In order to achieve a greater operating range, it may be desirable to use PMD compensators that include more than two birefringent generator sections. Unfortunately, PMD spectra generated with more than two sections are difficult to control, subject to misalignment, and are frequency dependent.

The number of birefringent sections is known to at least partially determine how much structure exists in the resultant PMD magnitude spectrum. If one were to take the Fourier transform of an exemplar PMD-magnitude spectrum artificially generated by several birefringent sections, several Fourier component frequencies would be evident. The number of sinusoidal Fourier components depends generally on the number of birefringent sections. For example, one birefringent section generates a PMD-magnitude spectrum that has only one Fourier component, the average, or DC, component. Two birefringent sections also generate a PMD spectrum whose magnitude also has only one Fourier component, again the DC component. Each additional birefringent section can generate multiple sinusoidal Fourier components that appear in the resultant PMD spectrum.

It is known that a concatenation of several birefringent sections can be used to synthesize a particular optical intensity spectrum. For example, in 1949 Evans, an astronomer, described a birefringent filter to improve solar observations (see, Evans "The Birefringent Filter," *J. Optical Soc. of America*, Vol. 39, No. 3, at 229–242 (March, 1939)) (hereinafter, "Evans"). Similarly, in 1961 Harris described a generalized filter synthesis method using birefringent filters (see, Harris et al. "Optical Network Synthesis Using Birefringent Crystals," *J. Optical Soc. of America*, Vol. 54, No. 10, at 1267–1279 (March, 1964)) (hereinafter, "Harris"). In both cases, a multi-stage birefringent filter was placed between two polarizers to generate an optical intensity spectrum.

Bührer U.S. Pat. No. 4,987,567 (hereinafter, "Bührer") describes an alternative device that includes a multi-stage birefringent filter between two polarization diversity stages. According to this design, optical power transmission was increased, albeit in the form of two optical beams. Buhrer's design has been extended to optical interleavers (see, e.g., U.S. Pat. Nos. 6,301,046, 6,215,923, 6,212,313, and 6,252,711).

Thus, Evans, Harris, and Bührer showed coherent birefringent filters. As used herein, a coherent birefringent filter is one in which each of the birefringent elements exhibits an optical retardation that is an integral multiple of a unit reference optical retardation, which must itself be an integral multiple of $2\pi$.

Fourier analysis of the resultant optical intensity spectrum generated by such coherent birefringent filters can, in general, reveal multiple sinusoidal frequency components. Moreover, it is known that the relative phase between each periodic component can be fixed to zero. A filter that exhibits multiple Fourier components having identical phase values, as transformed from an optical intensity spectrum, is referred to herein as a coherent filter. In general, a coherent optical filter exhibits high periodicity and high contrast ratio in its optical intensity spectrum.

Unlike the optical filtering shown by Evans, Harris, and Bührer, PMD generation does not permit frequency-dependent loss nor does it permit polarization-dependent loss. Unfortunately, the polarizers used by Evans and Harris generally produce substantial frequency-dependent and polarization-dependent losses. Also, the polarization diversity scheme shown by Bührer causes frequency-dependent loss on at least one of the output beams.

As mentioned above, it is known that PMD generators can be constructed from concatenated polarization maintaining (hereinafter, "PM") fibers. Rotation of fibers with respect to adjacent fibers can be coordinated in such a manner to generate various forms of PMD spectra. For example, I. T. Lima et al. reports a PMD emulator constructed with 15 polarization maintaining fibers and intermediate rotatable connectors (see, Lima et al., "Polarization Mode Dispersion Emulator," *OFC* 2000, Paper ThB4 (February 2000)). Alternatively, a PMD generator can be constructed with a concatenation of birefringent crystals. In this case, rotation of adjacent birefringent crystals (or control of intermediate polarization-transforming stages) can also be coordinated in such a manner to generate various forms of PMD spectra. For example, a PMD emulator can be constructed with 12 birefringent crystals (see, Damask, "A Programmable Polarization-Mode Dispersion Emulator for Systematic Testing of 10 Gb/s PMD Compensators," *OFC* 2000, Paper ThB3 (March, 2000)). None of the references, however, shows how to build a coherent PMD generator.

It would therefore be desirable to provide methods and apparatus for controllably generating coherent PMD spectra.

It would also be desirable to provide methods and apparatus to for generating coherent PMD spectra that coincide with the comb spectrum of a WDM optical communications system.

It would be further desirable to provide methods and apparatus to control coherent artificial PMD generation to independently generate first and second order PMD.

SUMMARY OF THE INVENTION

It is therefore an object of the present invention to provide methods and apparatus for controllably generating coherent PMD spectra.

It is also an object of the present invention to provide methods and apparatus for generating coherent PMD spectra that coincide with the comb spectrum of a WDM optical communications system.

It is another object of the present invention to provide methods and apparatus to control coherent artificial PMD generation to independently generate first and second order PMD.

According to one aspect of the present invention, a coherent PMD generator for generating a coherent PMD spectrum is provided. The generator includes at least four birefringent stages in optical series, thereby forming at least three pairs of adjacent stages. Each of the stages includes a harmonic differential group delay element and a phase-compensating element.

According to another aspect of the present invention, a colorless coherent PMD generator for generating a coherent PMD spectrum is provided. In this case, the generator is not only coherent, but is also made colorless because the DGD elements are colorless and the phase-compensating elements are locked.

According to yet another aspect of the present invention, a PMD generator can be controlled to generate DGD and second order PMD independently at at least one optical frequency by inducing polarization mode-mixing between the pairs of stages.

Methods for using these PMD generators, including their use in compensators and emulators, are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 27 shows an illustrative high-birefringent crystal having a length error and a low-birefringent crystal according to this invention;

FIG. 28 shows two independent intensity spectra corresponding to the crystals shown in FIG. 27 according to this invention;

FIG. 29 shows how the two spectra intensity shown in FIG. 28 add according to this invention;

FIG. 31 shows another illustrative coherent PMD generator according to this invention that includes four birefringent stages according to this invention;

FIG. 32 shows yet another illustrative PMD generator that is like the generator shown in FIG. 30, except that electro-optic elements, rather than half-wave waveplates, are used to polarization mode-mix;

DETAILED DESCRIPTION OF THE INVENTION

According to one aspect of this invention, a coherent PMD generator is provided. As used herein, a coherent PMD generator is an optical device that generates a coherent differential group delay (hereinafter, "DGD") spectrum: (1) that is harmonic and (2) whose Fourier components are in phase with one another. A harmonic DGD spectrum is a DGD spectrum that has Fourier component frequencies that have a common Fourier-component frequency denominator (i.e., are integral multiples of a unit Fourier-component frequency). It will be appreciated, therefore, that a DGD spectrum can be harmonic and incoherent, but a coherent DGD spectrum is always harmonic.

A coherent PMD generator according to another aspect of this invention can generate DGD spectra that exhibit high periodicity and high contrast ratios. The high-periodicity property can be used to advantageously align the generated DGD spectrum to a comb of WDM signals for use in PMD emulators and compensators.

Moreover, according to yet another aspect of this invention, a coherent PMD generator can be used to independently generate and control first and second order PMD.

Figure 1:
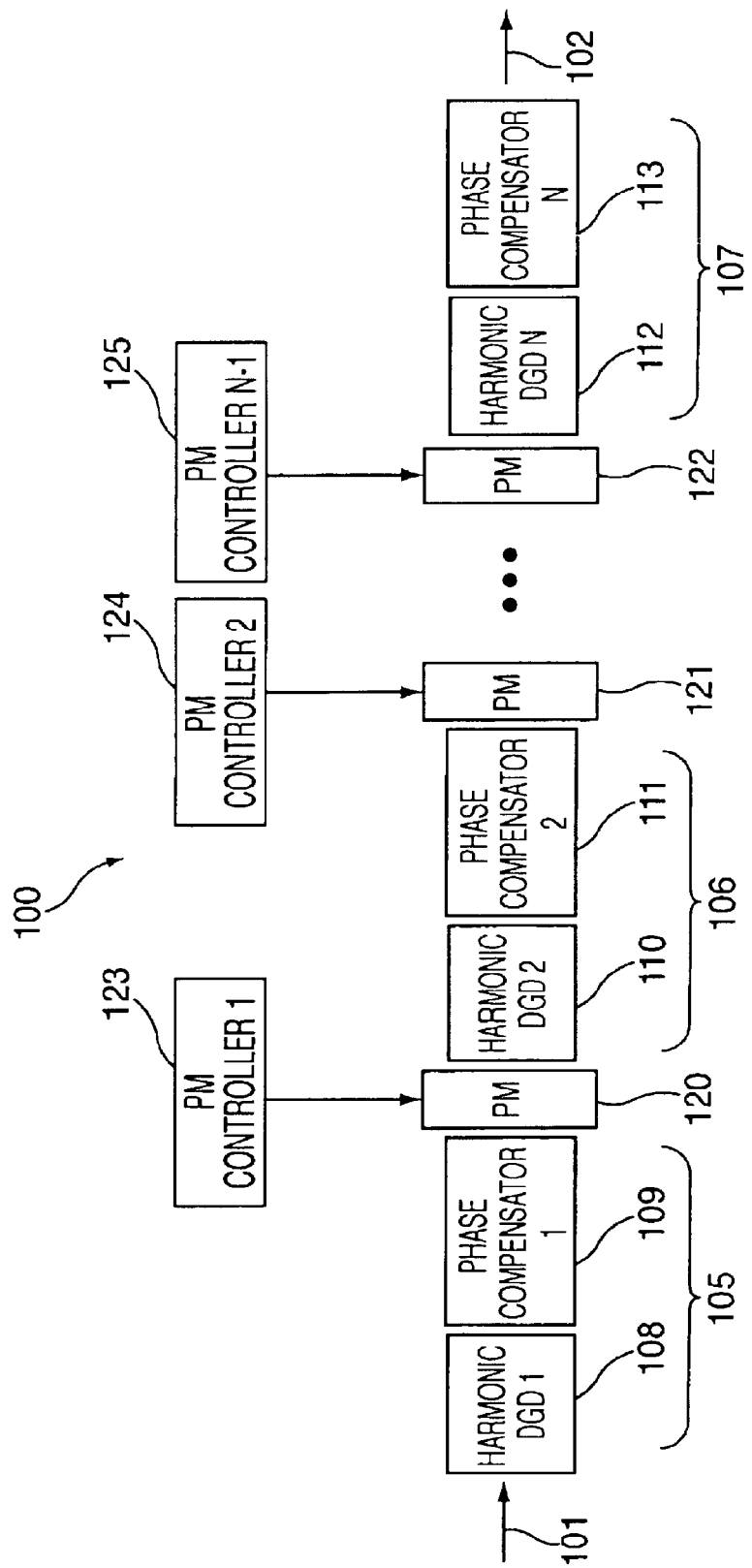
FIG. 1 shows a schematic diagram of an illustrative coherent PMD generator according to this invention.

FIG. 1 shows illustrative coherent PMD generator 100 according to this invention. During operation, input optical beam 101 propagates sequentially through each of the optical elements within generator 100, producing output optical beam 102, which has imparted coherent PMD spectrum. Generator 100 includes a plurality of coherent birefringent stages 105, 106, and 107. Stage 105, for example, includes harmonic DGD element 108 and respective phase compensator 109. Similarly, stages 106 and 107 include harmonic DGD elements 110 and 112, and phase compensators 111 and 113, respectively.

As used herein, DGD elements 108, 110, and 112 are harmonic because of their relationship to each other; that is, the relationship between the DGD values of the DGD elements. Accordingly, a plurality of DGD elements are considered harmonic when all of the respective DGD values are an integral multiple of a unit DGD value.

In addition to DGD elements 108, 110, ..., and 112, each of stages 105, 106, ..., and 107 has respective phase compensator elements 109, 111, ..., and 113. The combination of a DGD element and a phase compensator element in a stage, however, does not necessarily yield the target amount of retardation and, in general, has a residual optical retardation. In stage 105, for example, the combination of elements 108 and 109 generate a residual optical retardation. Thus, stages 105, 106, ..., and 107 are coherent when: (1) DGD elements 108, 110, ..., and 112 are harmonic and (2) the respective residual optical retardations are substantially the same. With respect to FIG. 1, then, PMD generator 100 is coherent when all DGD elements are harmonic and when all residual optical retardations are substantially the same. Although only three stages are shown in FIG. 1, it will be appreciated that the number of generation stages can be more or less than three.

A polarization mode-mixing element is located between any pair of adjacent stages. Mixing element 120, for example, is located between coherent birefringent stages 105 and 106. Similarly, mixing element 121 is located between stage 106 and a subsequent stage (not shown). Finally, mixing element 122 is located between a two stages, including final stage 107.

A mode-mixing controller controls each mode-mixing element. Mode-mixing controller 123, for example, controls the degree of polarization mode-mixing generated by polarization mode-mixing element 120. Likewise, mode-mixing controllers 124 and 125 control the degree of polarization mode-mixing generated by polarization mode-mixing elements 121 and 122, respectively.

Figure 2:
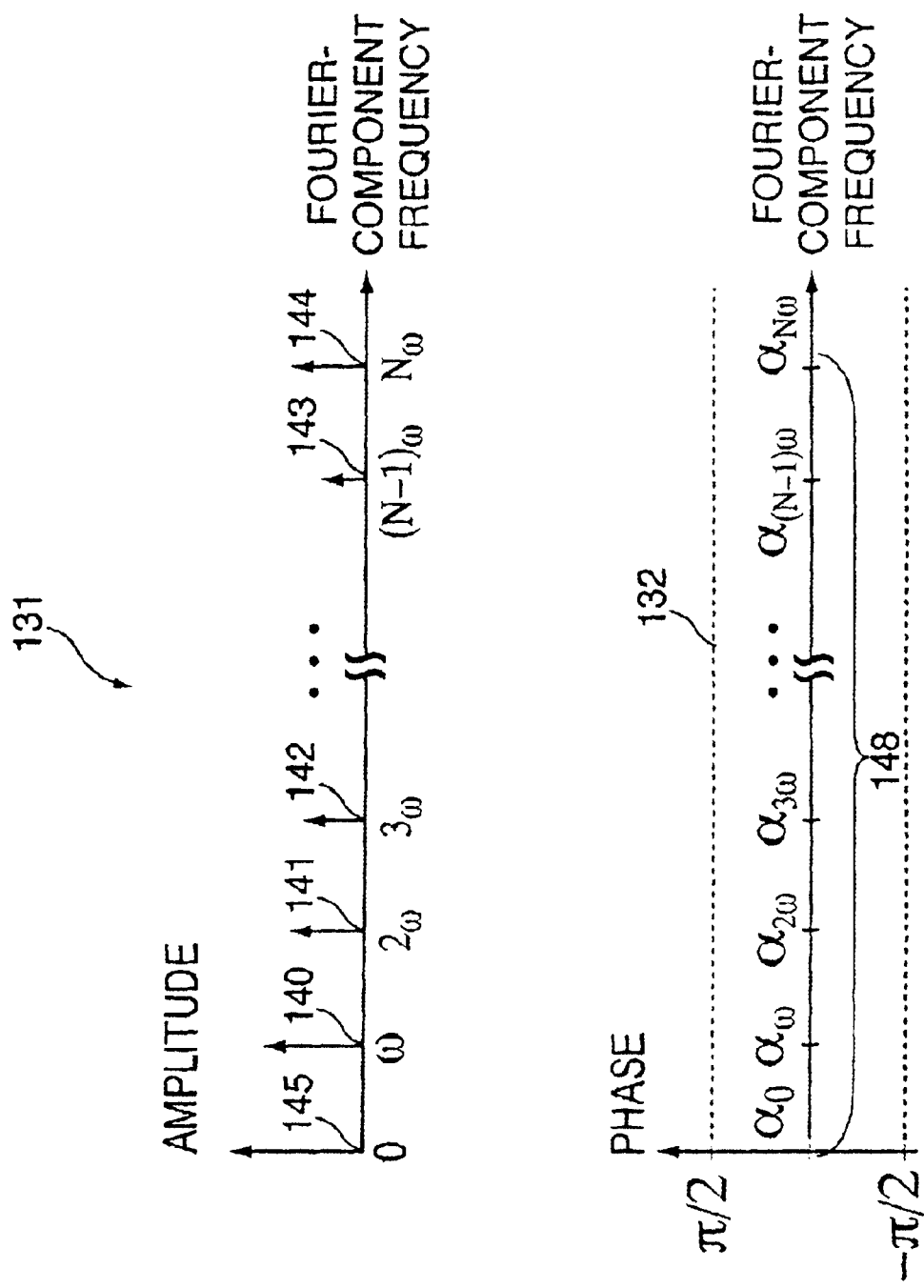
FIG. 2 shows illustrative Fourier transform spectra according to this invention, which have been calculated as the square of the DGD spectrum that can be generated at the output of the generator shown in FIG. 1.

FIG. 2 shows illustrative Fourier transform spectra, which have been calculated as the square of the DGD spectrum generated at output 102 of generator 100. The Fourier transform spectra include amplitude spectrum 131 and phase spectrum 132. Amplitude spectrum 131 is referred to as a harmonic amplitude spectrum because each of Fourier-component frequencies 140–145 is an integral multiple of unit Fourier-component frequency ω. For example, frequencies 141, 142, 143, and 144 are integral multiples of unit frequency at 140 (i.e., 2, 3, (N−1), and N times frequency ω, where N is an integer. It will be appreciated that DC Fourier-component frequency 145 is zero times unit Fourier-component frequency 140.

The amplitudes of Fourier-component frequencies 140 through 145 are determined, in part, by the degree of polarization mode-mixing generated along coherent PMD generator 100. These amplitudes can be positive or negative. The overall DGD spectrum generated at output 102 of generator 100 is also coherent because the phase amplitudes of the phase components 148 are substantially zero. Thus all sinusoidal Fourier components that form the DGD spectrum are aligned in phase and share an optical frequency where all the sinusoids are either at a maximum or at a minimum.

Figure 3:
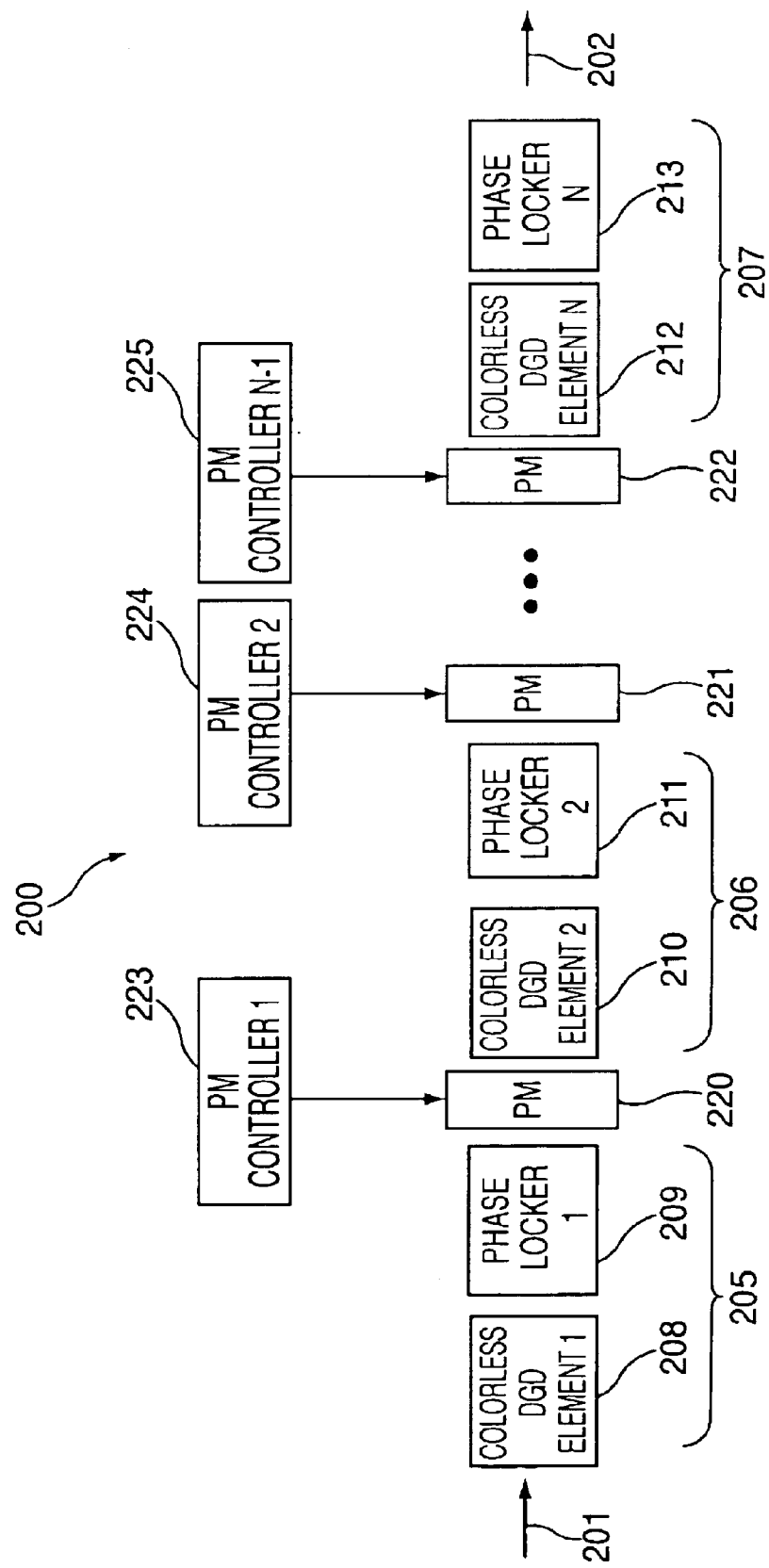
FIG. 3 shows a schematic diagram of an illustrative colorless coherent PMD generator according to this invention.

According to another aspect of the present invention, FIG. 3 shows illustrative colorless coherent PMD generator 200. In addition to being coherent, generator 200 is colorless. As used herein, the term "colorless" refers to the situation where the DGD value produced by generator 200 is substantially the same at any optical channel frequency of a WDM comb spectrum. As used herein, the term "comb spectrum" refers to a spectrum that has channels that are equally spaced in frequency.

Generator 200 includes a plurality of colorless, coherent birefringent stages 205, 206, . . . , and 207. Stage 205, for example, includes colorless harmonic DGD element 208 and phase-locking element 209. Similarly, stages 206 and 207 include colorless harmonic DGD elements 210 and 212, and phase-locking elements 211 and 213, respectively. Elements 208, 210, . . . , and 212 are similar to 108, 110, . . . , and 112, but are designed to have an additional property—the multiplicative inverse of the unit DGD value is substantially the same as channel spacing 260 along WDM comb spectrum 251. For example, the multiplicative inverse of a 10 picosecond DGD value is 100 GHz, which is a common channel spacing for WDM systems.

As mentioned above, phase-locking elements 209, 211, . . . , and 213 include all the properties of phase compensators 109, 111, . . . , and 113. Moreover, the residual optical retardations of stages 205, 206, and 207 (resulting from the internal pairs of colorless DGD elements and phase-locking elements), are chosen to generate an appropriate PMD spectrum on output beam 202. The PMD spectrum can be tuned such that a definable frequency of the generated DGD spectrum is aligned with a definable frequency of the WDM comb spectrum. Alignment can mean, for example, that center frequency 270 (located at the middle of flat DGD spectral segment 268) is aligned to WDM comb frequency 272. Colorless, coherent PMD generation has the advantage that the same apparatus can be used for PMD generation at any WDM optical channel frequency.

As shown in FIG. 3, colorless, coherent PMD generator 200 includes polarization mode-mixing elements between adjacent birefringent stages, each of which is controlled by a mode-mixing controller. Mixing element 220, for example, is located between stages 205 and 206. Similarly, mixing element 221 is located between stages 206 and a subsequent stage (not shown). Also, element 222 is located between two stages, including last stage 207.

Mode-mixing controllers control the degree of polarization mode-mixing. For example, controller 223 controls the degree of polarization mode-mixing generated by polarization mode-mixing element 220. Likewise, mode-mixing controllers 224 and 225 control the degrees of polarization mode-mixing generated by polarization mode-mixing elements 221 and 222, respectively.

Figure 4:
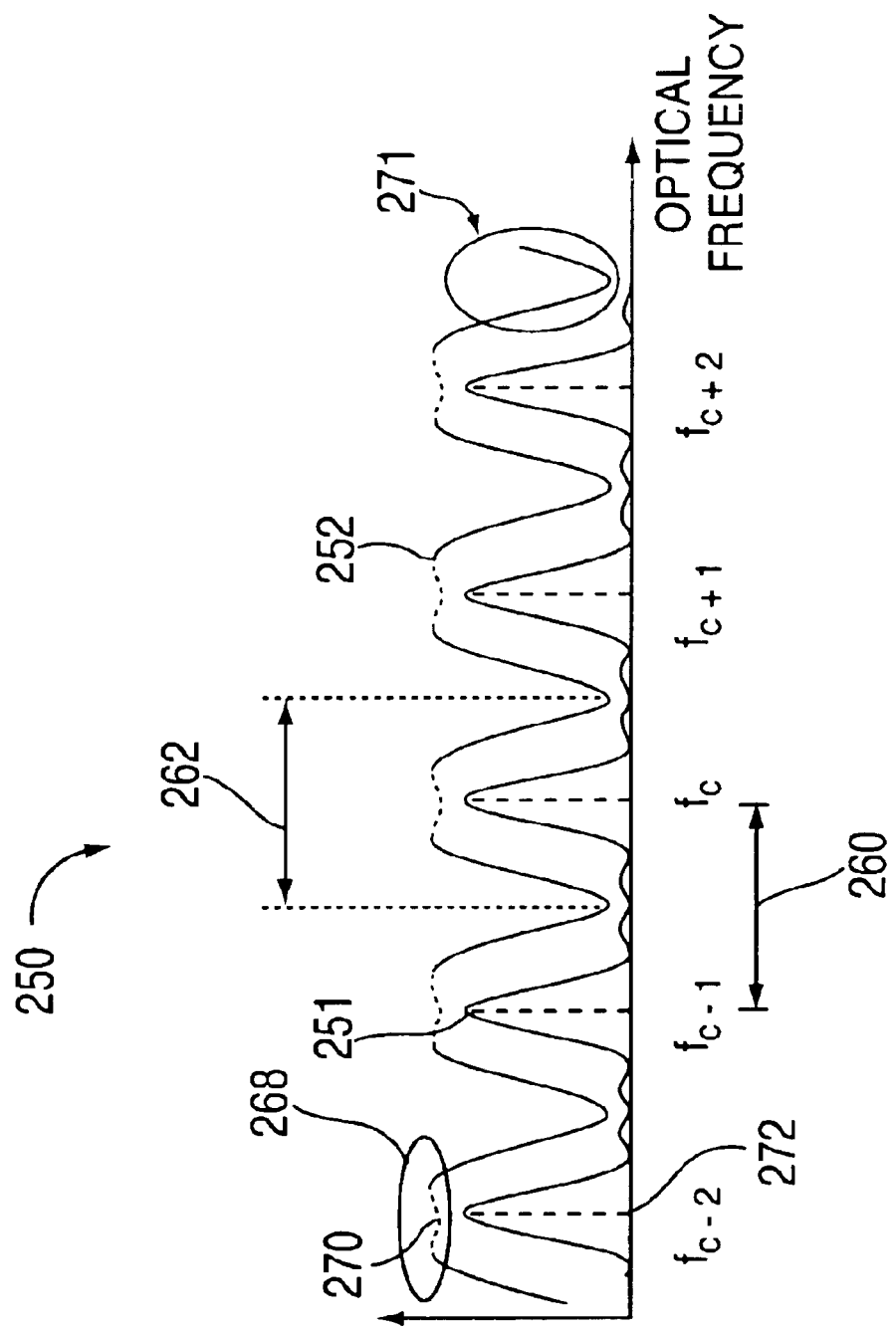
FIG. 4 shows a superposition of illustrative WDM power spectrum and DGD spectrum generated by the PMD generator shown in FIG. 3 according to this invention, both as a function of optical frequency.

FIG. 4 shows a superposition of illustrative WDM power spectrum 251 and DGD spectrum 252 generated by generator 200, both as a function of optical frequency. Free-spectral range 262 of colorless DGD spectrum 252 is selected to be the same as channel spacing 260 along spectrum 251. In this example, middle frequency 270 of flattened middle portion 268 of DGD spectrum 252 is aligned with WDM channel center frequency 272.

The portion of DGD spectrum 252 that rapidly changes (i.e., edge portion 271 is, in this case, located between the WDM channels so that no channel experiences the highly variable, and rapidly changing portion of the PMD spectrum. Because both spectra 251 and 252 are periodic and share the same period, the same amount of PMD can be imparted to each WDM channel.

Figure 5:
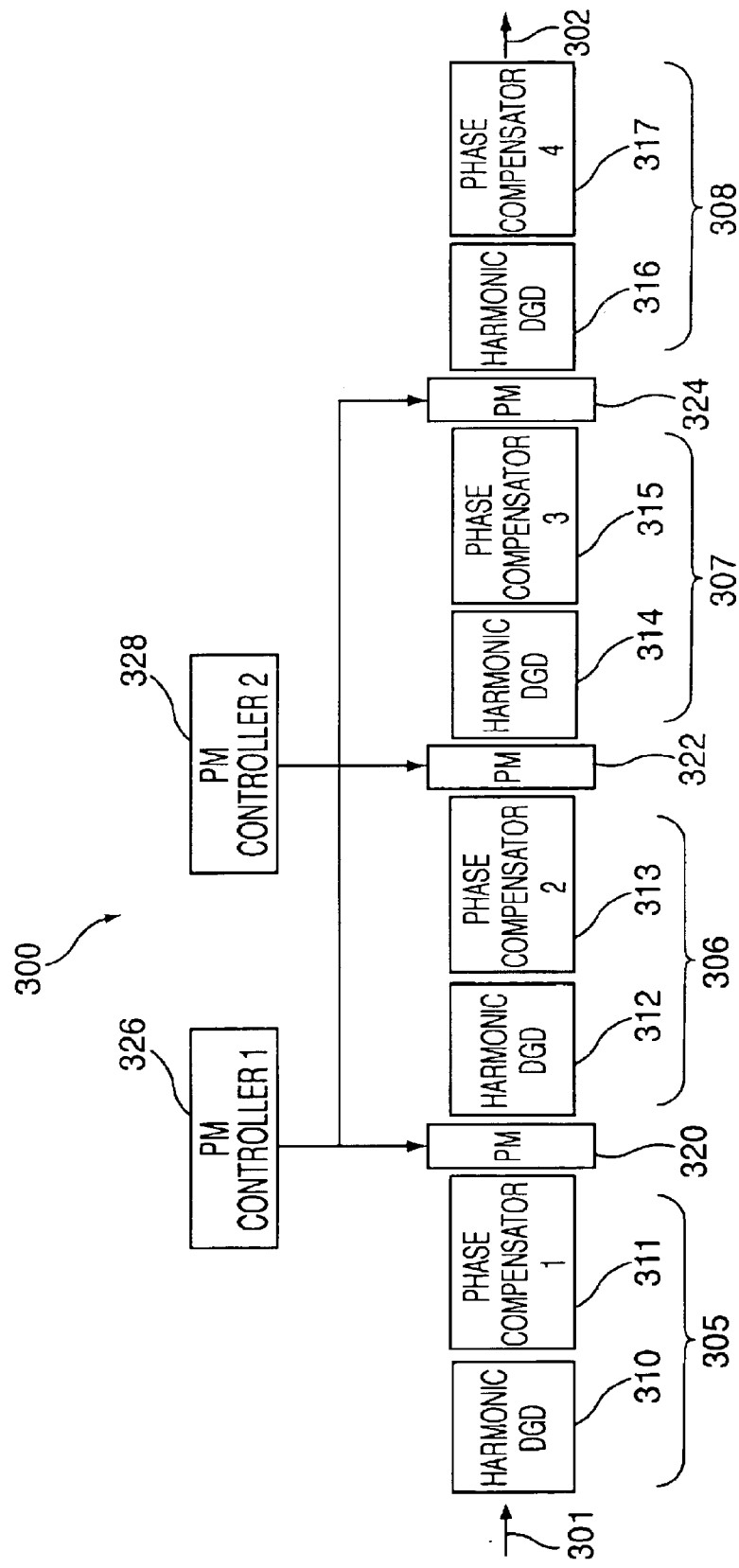
FIG. 5 shows a schematic block diagram of an illustrative independent first and second order PMD generator according to this invention.

According to another aspect of this invention, a PMD generator can be constructed that is capable of generating and controlling first and second order PMD independently. FIG. 5 shows illustrative independent first and second order PMD Generator (hereinafter, "IFSO PMD generator") 300. IFSO PMD generator 300 includes at least four (e.g., four stages, eight stages, etc.) coherent birefringent stages 305, 306, 307, and 308 and three intermediate polarization mode-mixing elements 320, 322, and 324. Each of stages 305, 306, 307, and 308 includes harmonic DGD element 310, 312, 314, and 316, respectively. Preferably, the DGD values of these DGD elements are substantially the same.

IFSO PMD generator 300 also includes mode-mixing controllers 326 and 328. In this embodiment, controller 326 controls elements 320 and 324 and controller 328 only controls element 322. IFSO PMD generator 300 has the remarkable property that first and second order PMD can be generated and independently controlled at optical output 302 for a particular comb of optical frequencies. As discussed more fully below, independent control of first and second order PMD generation has a number of advantages when used in PMD emulators or compensators.

Coherent birefringent stages 305, 306, 307, and 308 include harmonic DGD elements 310, 312, 314, and 316, respectively. The DGD values of these elements can be the substantially same. IFSO PMD generator 300 is like coherent PMD generator 100 in that the four residual optical retardations values generated in each stage is largely determined by pairs of harmonic DGD elements 310, 312, 314, and 316 and respective phase compensator elements 311, 313, 315, and 317. In this embodiment, these residual optical retardations are substantially the same. As already discussed above, each of phase compensators 311, 313, 315, and 317 is selected separately to compensate for phase errors present in its paired DGD element.

Figure 6:
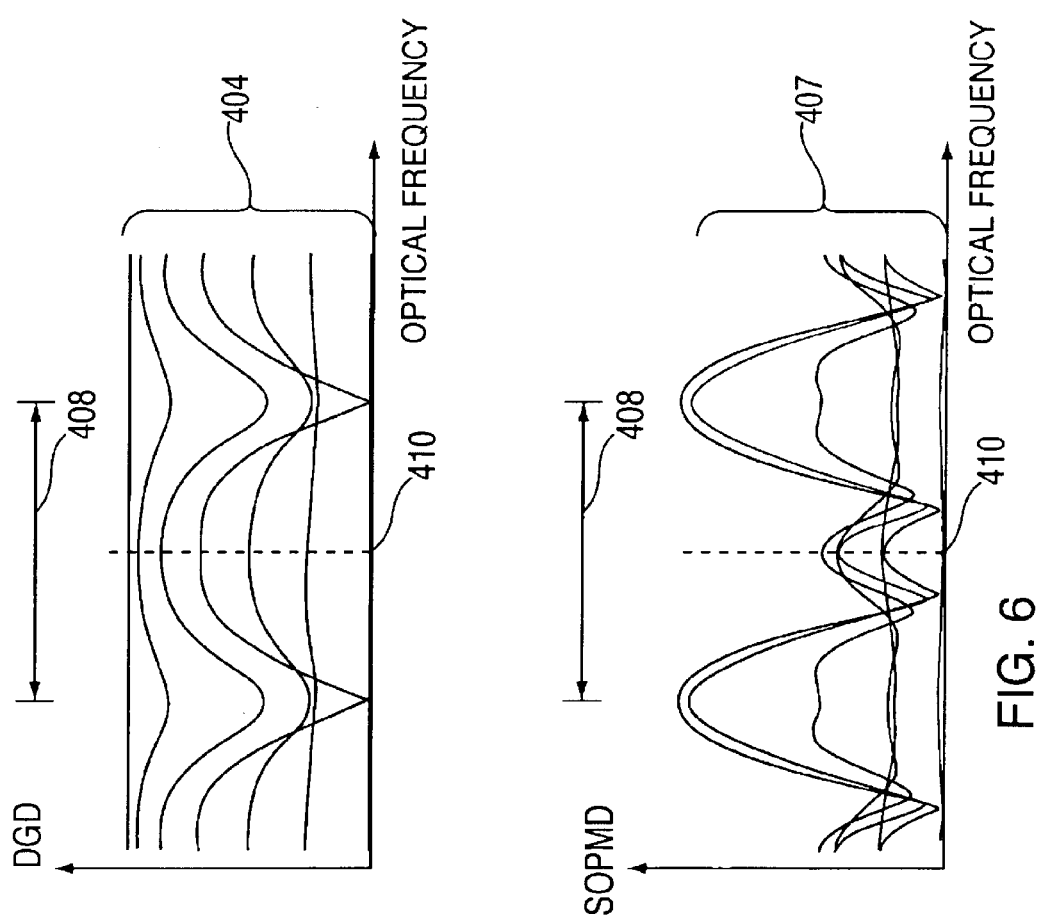
FIG. 6 shows two sets of illustrative frequency-dependent spectra that can be generated using, for example, the PMD generator of FIG. 5 according to this invention.

FIG. 6 shows two sets of illustrative frequency-dependent spectra that can be generated using, for example, IFSO PMD generator 300. Upper set 404 is a series of DGD spectra and lower set 407 is a series of magnitude second order PMD (hereinafter, "SOPMD") spectra. Each set includes seven spectra as a function of optical frequency 405 corresponding to seven degrees of mode-mixing determined by controllers 326 and 328.

It will be appreciated that both upper and lower sets 404 and 407 are periodic and have free-spectral range 408. Spectral center frequency 410 corresponds to the maximum DGD value for generated DGD spectrum 404. It will be further appreciated that the DGD and SOPMD values at frequency 410 can be determined for all degrees of mode-mixing, which are controlled by controllers 326 and 328.

Figure 7:
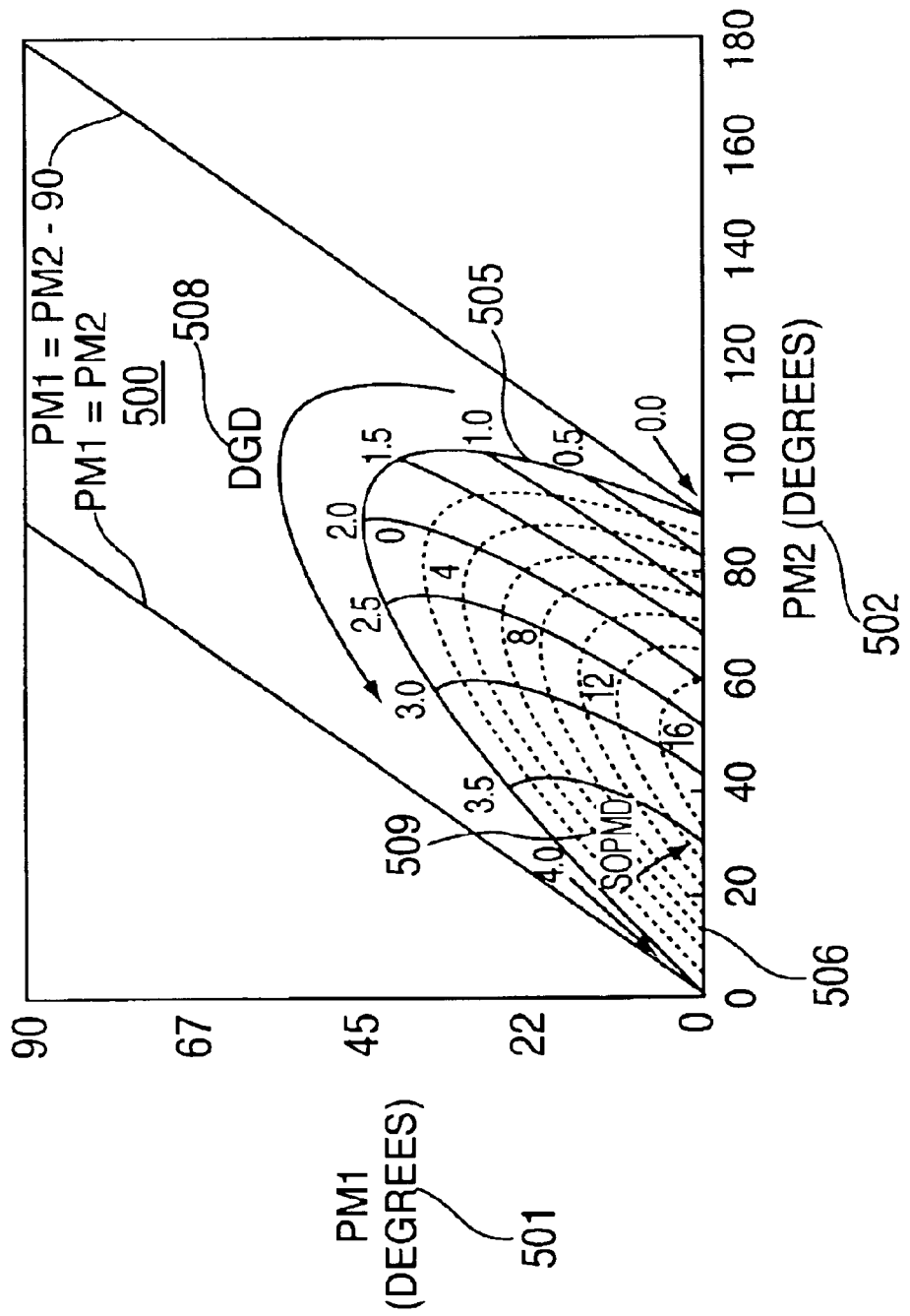
FIG. 7 shows an illustrative contour plot of DGD and SOPMD values at an optical frequency for varying degrees of mode-mixing between the stages of the generator shown in FIG. 5.

For example, FIG. 7 shows illustrative contour plot 500 of DGD and SOPMD values at frequency 410 for values 501 of mode-mixing controller 326 and values 502 of mode-mixing controller 328. As shown in FIG. 7, values 501 and 502 of controllers 326 and 328 lie within the space defined by contours 505 and 506. Within this space, DGD and SOPMD vary monotonically between zero and a maximum. Contour set 508 shows various combinations of controller values 501 and 502 that maintain a particular DGD value. Similarly, contour set 509 shows various combinations of controller values 501 and 502 that maintain a particular SOPMD value. Thus, IFSO PMD generator 300 can access any DGD/SOPMD state within the restricted space, and particularly, can either: (1) access any DGD value with or without changing the concomitant SOPMD value, or (2) access any SOPMD value with or without changing the concomitant DGD value.

Alternatively, generator 300 can access any DGD/SOPMD state along any predetermined trajectory. That trajectory can be, for example, a constant DGD value trajectory, a constant SOPMD value trajectory, a fixed rate of change of a DGD value trajectory, a fixed rate of change of a SOPMD value trajectory, and any combination thereof.

Figure 8:
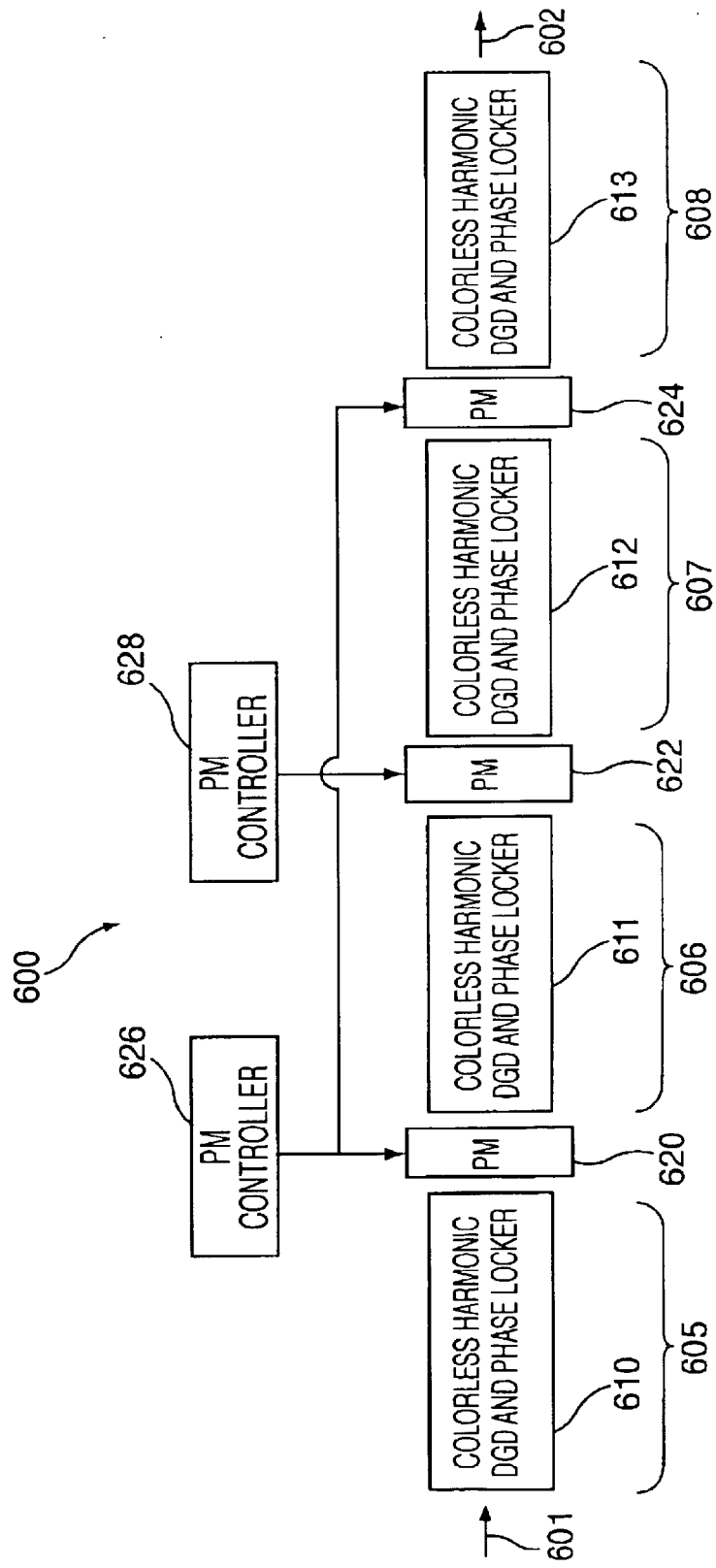
FIG. 8 shows a schematic diagram of an illustrative colorless IFSO PMD generator according to this invention.

FIG. 8 shows illustrative colorless IFSO PMD generator 600 according to this invention. Generator 600 combines the technology used to create colorless coherent PMD generator 200 and IFSG generator 300. Colorless IFSO PMD generator 600 can advantageously generate PMD on output beam 602 with: (1) independent control of first and second order PMD and (2) the same PMD state for each channel of the WDM channel comb. A colorless IFSO PMD generator can be especially useful when used in a PMD compensator because only one generator is necessary to generate a selectable amount of first and second order PMD for every WDM channel.

FIG. 8 shows illustrative colorless IFSO PMD generator 600. IFSO PMD generator 600 includes at least four coherent birefringent stages 605, 606, 607, and 608 and three intermediate polarization mode-mixing elements 620, 622, and 624. Each of stages 605, 606, 607, and 608 includes a colorless harmonic DGD element/phase-locking element pair 610, 611, 612, and 613, respectively.

Generator 600 also includes mode-mixing controllers 626 and 628. Like generator 300, controller 626 of generator 600 controls elements 620 and 624 and controller 628 only controls element 622. IFSO PMD generator 600 can generate and independently control first and second order PMD for a particular comb of optical frequencies.

Generator 600 is like coherent PMD generators 100 and 300 in that the four residual optical retardations values generated in each stage is largely determined by the component DGD elements and phase elements, but in this case the residual optical retardations are substantially the same and are phase-locked. As already discussed above, each of phase compensation elements are selected to compensate for phase errors present in its paired DGD element. In particular, the phase-locking elements are selected to generate four residual optical retardation values that are substantially the same at the output of each colorless-harmonic-DGD and phase-locking element pair, and such that the PMD spectrum at output beam 602 is appropriately aligned with the WDM comb spectrum (see above). Also, controllers 326 and 328 are operated such that independent first and second order PMD can be generated at output 602.

Thus, coherent PMD generator 100, colorless coherent PMD generator 200, IFSO PMD generator 300, and colorless, coherent PMD generator 600 all impart a controllable amount of coherent PMD onto an output beam. The following detailed description is divided into three parts: coherent PMD generation, colorless PMD generation, and independent first and second order PMD control.

Coherent PMD Generation

As mentioned above, PMD is an optical property that can be generated by a concatenation of two or more birefringent elements. Such concatenations are known, in general, to generate PMD frequency-dependent spectra. A PMD spectrum includes two components: the polarization state of its Principal State of Polarization, or "PSP", as represented in three-dimensional Stokes' space; and the DGD between signals aligned along the two orthogonal PSPs, as represented by a positive-definite magnitude in units of time. It is well known that DGD is just the magnitude of PMD of the concatenation.

Figure 9:
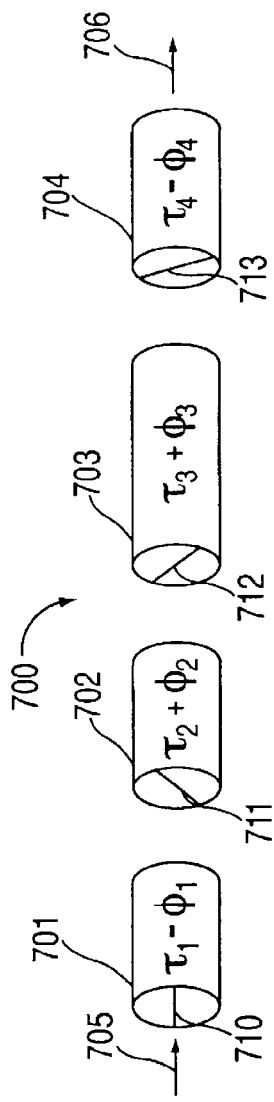
FIG. 9 shows a perspective view of a concatenation of four birefringent elements.

FIG. 9 shows a perspective view of a concatenation of four birefringent elements 701–704, optical input beam 705 and optical output beam 706. Without loss of generality, and for purposes of illustration only, birefringent elements 701, 702, 703, and 704 will be considered as uniaxial birefringent. A birefringent element is a dielectric medium that exhibits more than one index of refraction. A uniaxial birefringent medium can be characterized by two ordinary refractive indices and one extraordinary refractive index, where each refractive index lies along one of three mutually orthogonal axes of the birefringent medium. In contrast, a biaxial birefringent medium is generally characterized by three different refractive indices, where each refractive index lies along one of the three mutually orthogonal axes. The birefringence of a uniaxial birefringent medium is the difference between the extraordinary and ordinary refractive indices.

The different lengths of birefringent elements 701, 702, 703, and 704 illustrate that the elements can have different DGD values. It is well known that the DGD value of a single birefringent element is the product of its birefringence and its length, divided by the speed of light. Birefringent elements 701–704 have DGD values $\tau_1$, $\tau_2$, $\tau_3$, and $\tau_4$ and residual optical retardations $\phi_1$, $\phi_2$, $\phi_3$, and $\phi_4$, respectively.

Representative extraordinary axes 710, 711, 712, and 713 are shown in the faces of the respective birefringent elements and illustrate one set of possible relative orientations. Polarization mode-mixing occurs at the interface between adjacent elements. Polarization mode-mixing can be zero when the extraordinary axes between two adjacent elements are parallel or perpendicular. Polarization mode-mixing can be maximized when the two extraordinary axes between two adjacent elements are at a 45 degree angle. Thus, selection of appropriate DGD values for the individual birefringent elements and control of the degree of polarization mode-mixing between these elements can be used to controllably generate PMD.

Figure 10:
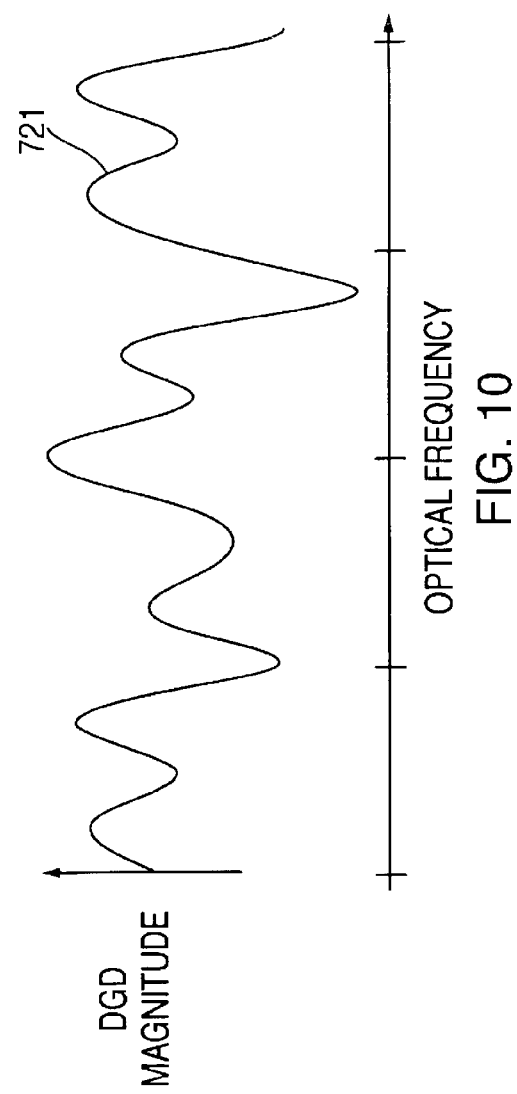
FIG. 10 shows a frequency-dependent DGD spectrum that can be generated with the concatenation shown in FIG. 9.

FIG. 10 shows illustrative frequency-dependent DGD spectrum 721. Inspection of spectrum 721 reveals that it exhibits oscillations and is periodic. By definition, DGD is the square-root of the determinant of the frequency-derivative of a unitary transformation matrix corresponding to a birefringent concatenation. The spectrum of the frequency-derivative of the unitary transformation matrix is therefore related to the square of the DGD spectrum. It will be further appreciated that a Fourier analysis of any DGD spectrum squared is directly representative of the number of birefringent elements and the respective DGD magnitudes and residual optical retardations of those elements.

Figure 11:
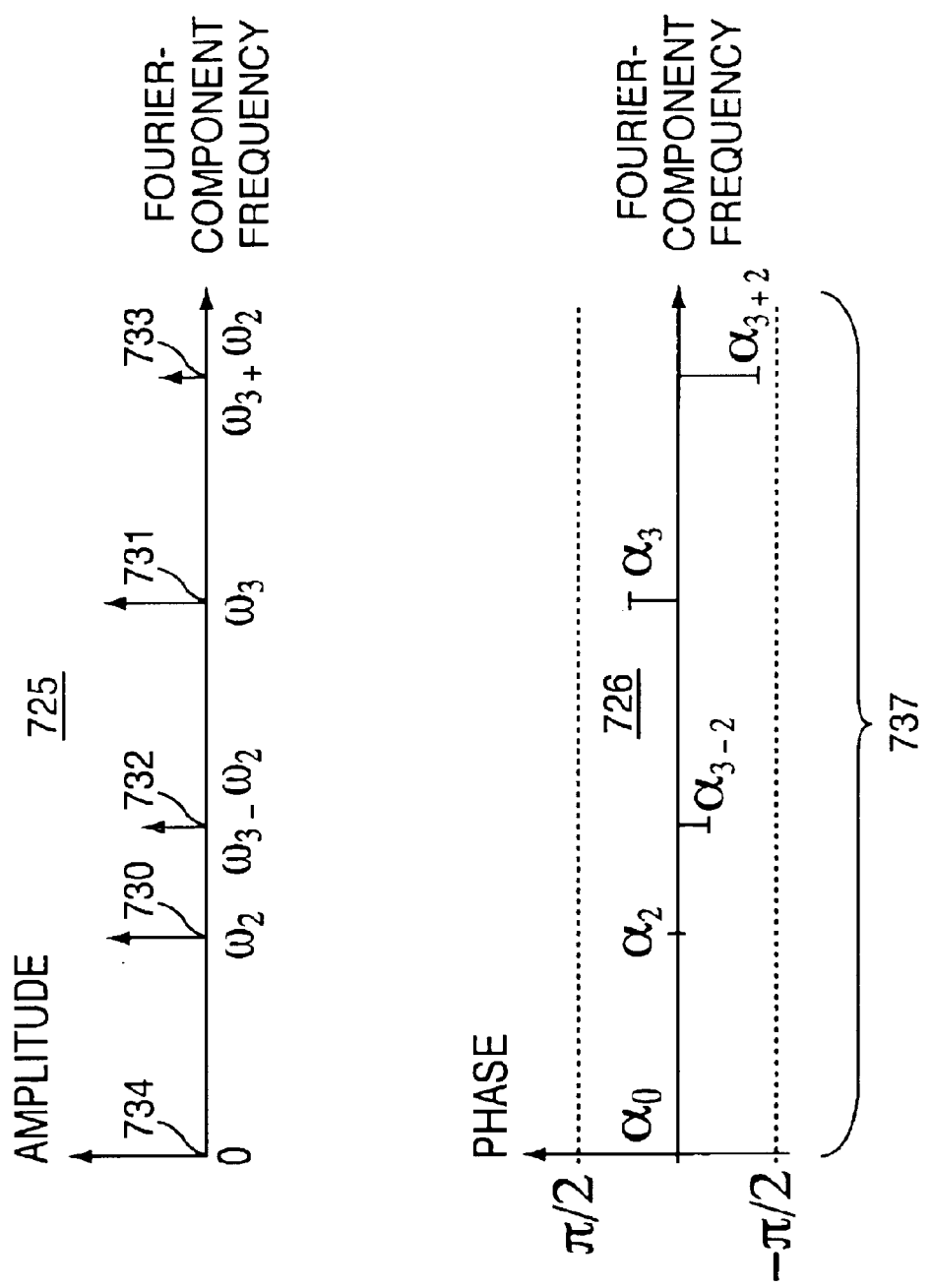
FIG. 11 shows a Fourier analysis of the square of DGD spectrum of FIG. 10.

FIG. 11 shows an illustrative Fourier analysis of the square of DGD spectrum 721. As with any Fourier analysis, there is an amplitude and phase associated with each Fourier component. Amplitude spectrum 725 and phase spectrum 726 are plotted as a function of Fourier-component frequency. As shown in FIG. 11, and in general, a four-stage birefringent concatenation yields four Fourier-component frequencies: individual frequencies 730 and 731, difference frequency 732, and sum frequency 733. Individual frequencies 730 and 731 are the inverse of the DGD value from birefringent elements 702 and 703, respectively. That is, birefringent elements 701 and 704, located on either end of the concatenation, do not contribute to the Fourier-component spectrum. ω denotes Fourier-component frequency, and ω=1/τ.

Additionally, DC Fourier-component frequency 734 represents the average magnitude of the DGD-spectrum squared. Thus, in general, an N-stage birefringent concatenation generates Fourier-component frequencies associated with each birefringent element other than the end elements, and further generates sum and difference frequencies. The Fourier-component frequencies generated by a concatenation do not change as the polarization mode-mixing change. The amplitudes and phases of the Fourier-components, however, do change.

Figure 12:
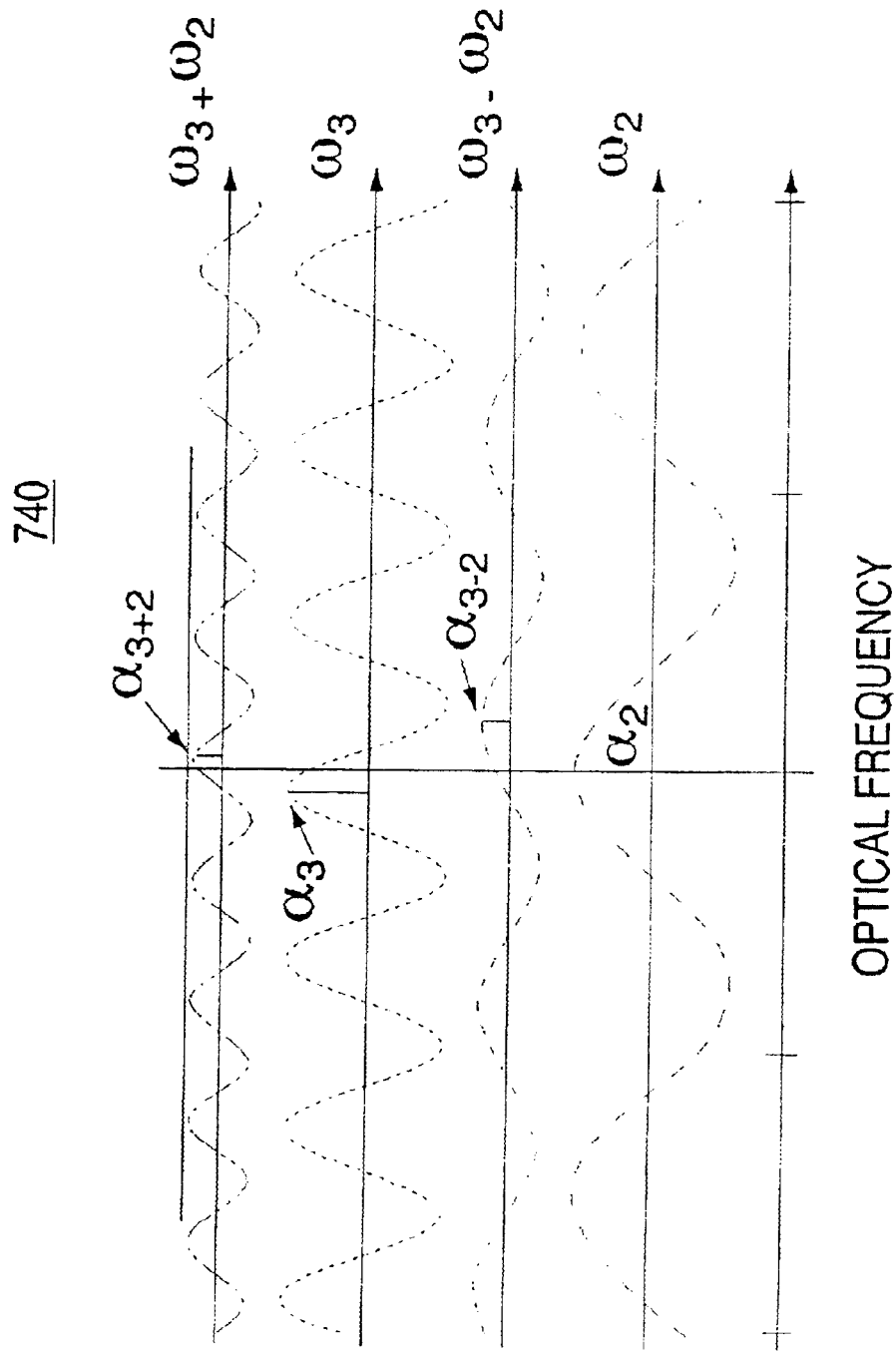
FIG. 12 shows the four Fourier-component sinusoids with respective amplitudes and phases as plotted in optical frequency (excluding the DC component) associated with the Fourier spectra of FIG. 11.

FIG. 12 shows the four Fourier-component sinusoids with respective amplitudes and phases as plotted in optical frequency (excluding DC component 730) associated with the Fourier spectra of FIG. 11. The square-root of the sum of components 740 and the DC component yields DGD spectrum 721 of FIG. 10. The amplitudes and phases of spectra 725 and 726 are used to calculate sinusoidal components 740. The overall resultant DGD spectrum, while periodic, appears irregular, exhibits a long periodicity, and can exhibit a low contrast ratio of maximum to minimum DGD magnitude. Concatenation 700 does not, in general, generate coherent PMD.

Figure 13:
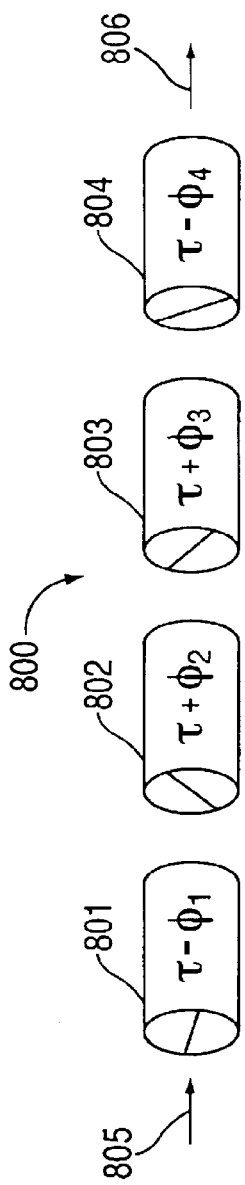
FIG. 13 shows an illustrative concatenation of four birefringent elements according to this invention, where each of these elements has the same DGD value.

FIG. 13 shows concatenation 800 of four birefringent elements 801–804, as well as optical input beam 805 and output beam 806. These elements have the same DGD values (i.e., $\tau_1=\tau_2=\tau_3=\tau_4$) but may have different residual optical retardations $\phi_1$, $\phi_2$, $\phi_3$, and $\phi_4$.

Figure 14:
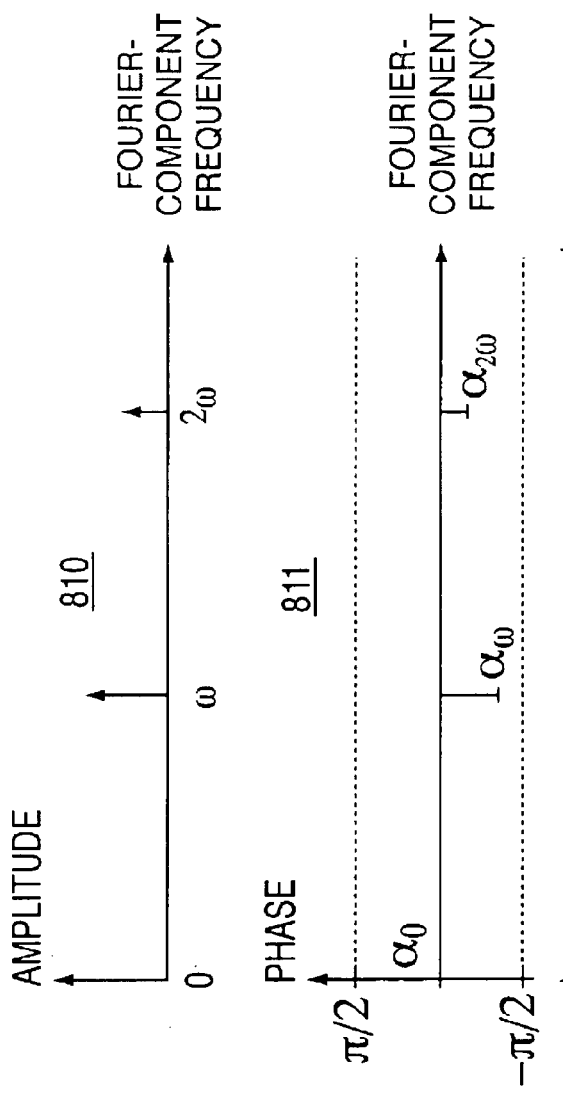
FIG. 14 shows illustrative amplitude spectrum and phase spectrum associated with a DGD spectrum (see FIG. 15) of the concatenation shown in FIG. 13 according to this invention.

FIG. 14 shows illustrative amplitude spectrum 810 and phase spectrum 811 associated with resultant DGD spectrum 830 (see FIG. 15) of concatenation 800. The individual Fourier-component frequencies are degenerate at frequency ω because the DGD magnitudes of the two middle stages in 800 are the same. Sum Fourier-component frequency is 2ω, and difference Fourier-component frequency is zero.

Thus, concatenation 800 is not coherent but Fourier-component frequencies ω and 2ω are harmonic because the frequencies are equal to an integral number of a unit frequency ω. Because residual optical retardations $\phi_1$, $\phi_2$, $\phi_3$, and $\phi_4$ are not necessarily equal to each other, the Fourier-component phase values are, in general, different at frequencies ω and 2ω.

Figure 15:
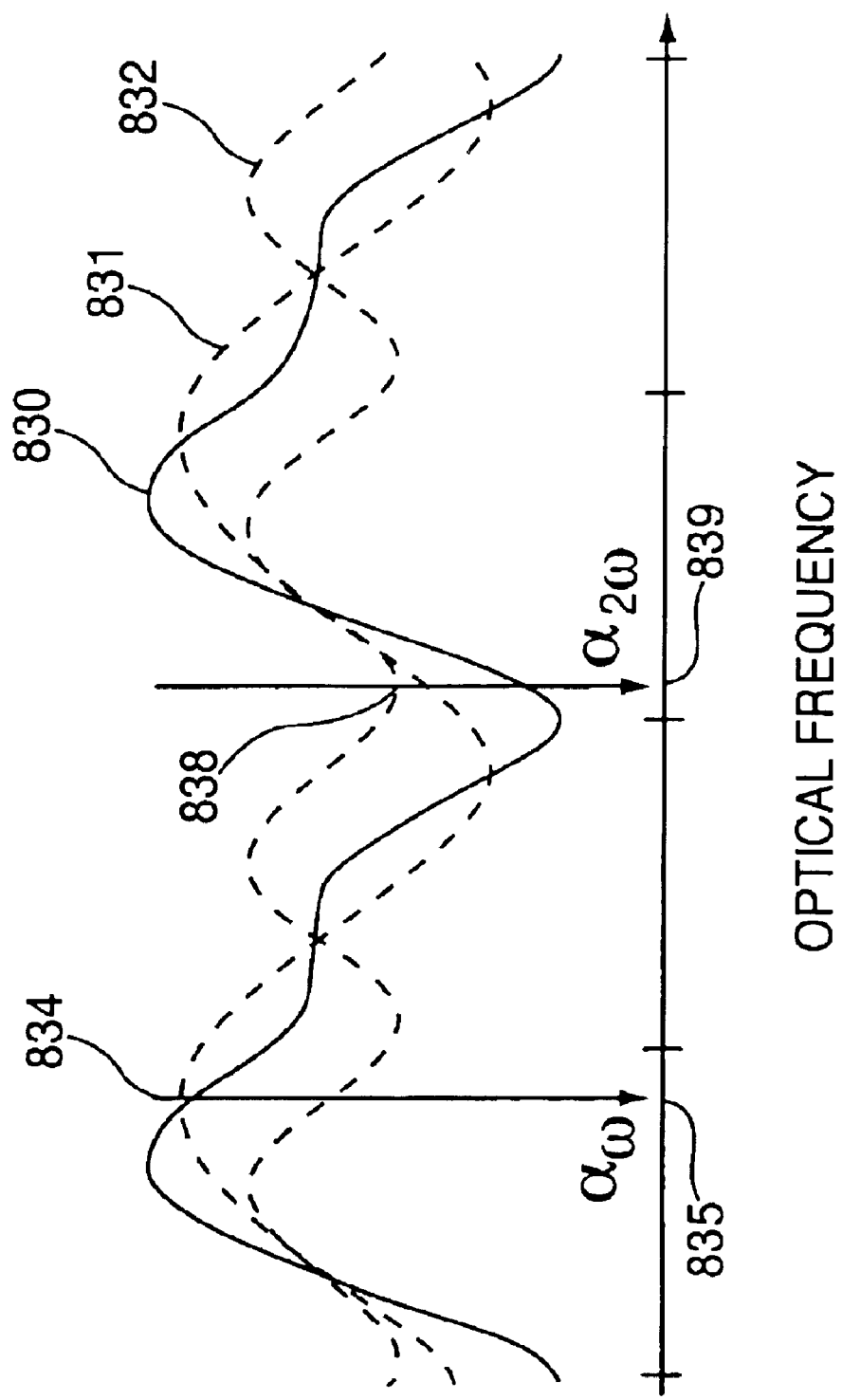
FIG. 15 shows an illustrative DGD spectrum and Fourier-component sinusoids according to this invention.

FIG. 15 shows resultant DGD spectrum 830, Fourier-component sinusoid 831 (Fourier-component frequency ω) and Fourier-component sinusoid 832 (Fourier-component frequency 2ω). Because the Fourier-component phase values are different for each Fourier-component frequency, optical frequency 835, at which Fourier-component sinusoid 831 reaches maximum 834, and optical frequency 839, at which Fourier-component sinusoid 832 reaches minimum 838, are not the same. Thus, a concatenation having the same DGD for each stage yields a harmonic Fourier-component spectrum, but does not necessarily yield a coherent DGD spectrum.

Figure 16:
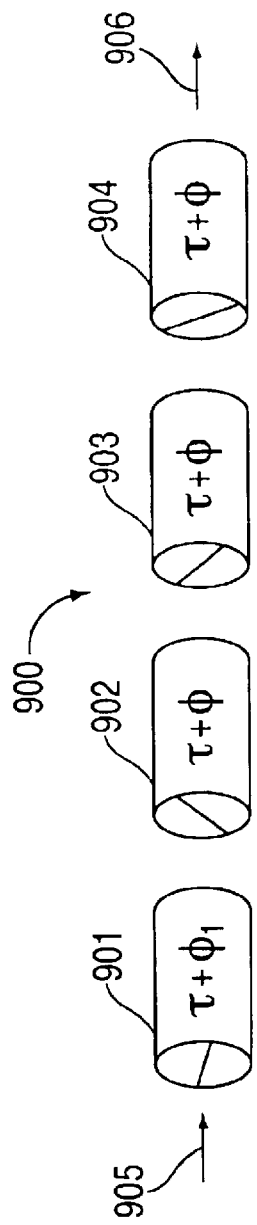
FIG. 16 shows illustrative concatenation of four like birefringent elements, as well as an optical input beam and an optical output beam, according to this invention.
Figure 17:
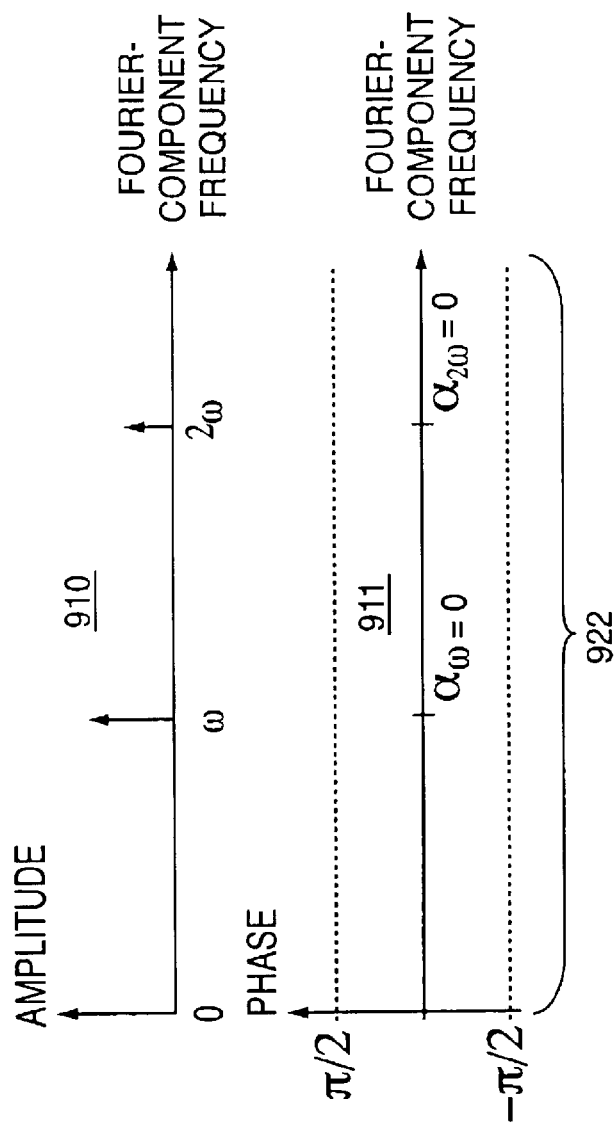
FIG. 17 shows illustrative amplitude spectrum and phase spectrum associated with a DGD spectrum (see FIG. 18) of the concatenation shown in FIG. 16 according to this invention.

FIG. 16 shows concatenation 900 of four like birefringent elements 901–904 and optical input beam 905 and output beam 906. Each of elements 901–904 has the same DGD value τ and the same residual optical retardation $\phi$. FIG. 17 shows illustrative amplitude spectrum 910 and phase spectrum 911 associated with DGD spectrum 930 (see FIG. 18) of concatenation 900. As with concatenation 800, the individual Fourier-component frequencies are degenerate at frequency ω because the DGD magnitudes of middle stages 902 and 903 are the same. Sum Fourier-component frequency 2ω, and difference Fourier-component frequency is zero. Because the residual optical retardations for all elements in concatenation 900 are the same, the Fourier-component phase values are also the same at Fourier-component frequencies ω and 2ω.

Figure 18:
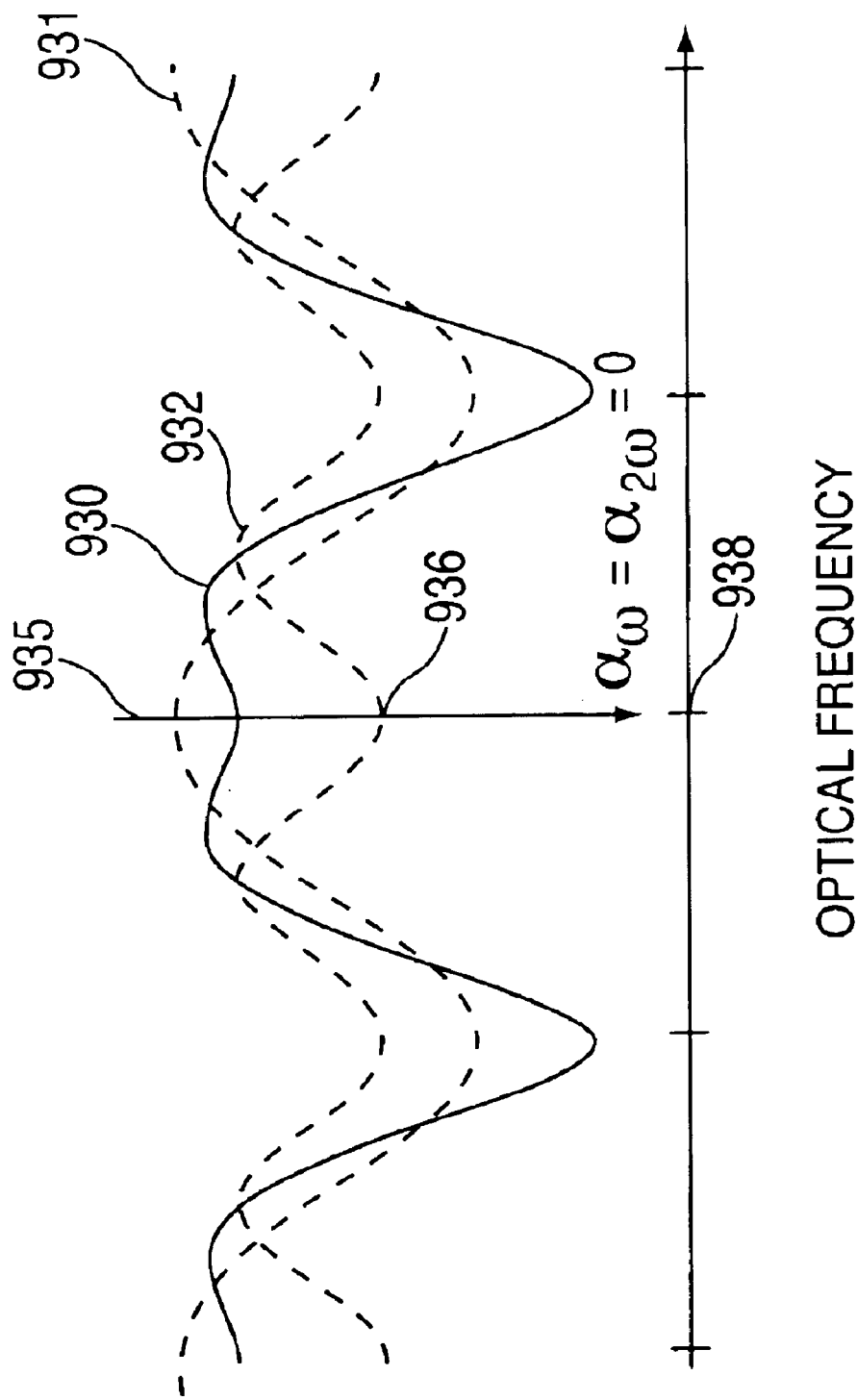
FIG. 18 shows an illustrative DGD spectrum and Fourier-component sinusoids according to this invention.

FIG. 18 shows resultant DGD spectrum 930, Fourier-component sinusoid 931 (Fourier-component frequency ω) and Fourier-component sinusoid 932 (Fourier-component frequency 2ω). Because the Fourier-component phase values are the same, optical frequency 938, at which Fourier-component sinusoid 931 reaches maximum 935 and Fourier-component sinusoid 932 reaches minimum 936, is the same. Thus, in this special case, the resultant DGD spectrum is coherent because all of constituent Fourier-component sinusoids are in phase.

It will be recognized the a concatenation according to this invention can be coherent if (1) each of the elements has a DGD value that is substantially an integral multiple of a unit DGD value and (2) each residual optical retardation divided by its respective DGD value is substantially the same for all elements.

For example, the four stages could have τ, 2τ, 4τ, and 8τ as DGD values. The resultant Fourier-component frequencies are harmonic because each frequency is an integral number times a base frequency. The periodicity of the resultant DGD spectrum is, in general, different from the case where all DGD values are the same, but the property of coherence can be retained when all the Fourier-component phases align.

Stable birefringent elements should be used when constructing coherent PMD generators. Birefringent elements that can be used in accordance with this invention include birefringent crystals, such as yttrium ortho-vanadate ($YVO_4$), rutile, lithium niobate ($LiNbO_3$), mica, and crystalline quartz. High-birefringent crystals are birefringent crystals that have a relatively high birefringence with respect to another crystal. However, certain birefringent crystals are nominally referred to as high-birefringent crystals, such as $YVO_4$ and rutile, even without reference to another crystal. In contrast, mica and crystalline quartz, for example, are often referred to as low-birefringent crystals.

Figure 19:
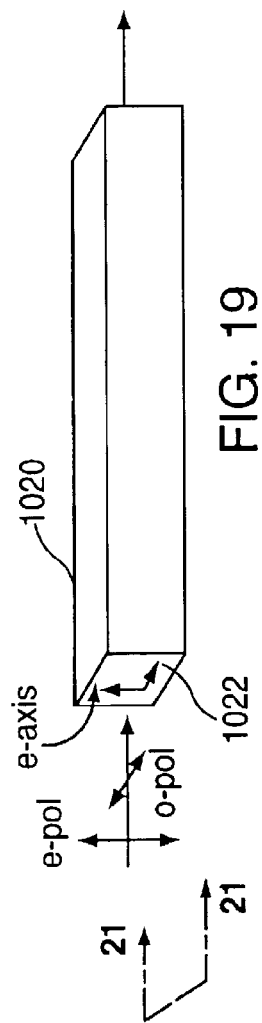
FIG. 19 shows a perspective view of an illustrative uniaxial birefringent crystal cut as a parallelepiped with its extraordinary axis shown at the input.

FIG. 19 shows illustrative uniaxial birefringent crystal 1020 cut as a parallelepiped with its extraordinary axis ("e-axis") shown at face 1022 of the input. It is known that within any dielectric medium, such as a birefringent crystal, the wavelength of an optical beam is shortened from the corresponding free-space wavelength by the value of the refractive index that the beam experiences. The refractive index that the beam experiences depends, at least partially, on the polarization state of the beam. If the polarization state has a component that is aligned with the extraordinary axis of the crystal, that component experiences the extraordinary refractive index. The same applies for polarization components aligned with an ordinary axis.

It is also known that the velocity of an optical beam depends on the refractive index that the beam experiences. Because of this dependence, there are two distinct velocities possible within a uniaxial birefringent material. Thus, a polarization component that is aligned with the extraordinary axis travels at a different velocity from a polarization component aligned with one of the ordinary axes. In general, an arbitrary polarization state that enters a uniaxial birefringent medium is resolved into two distinct beams, each having a linear orthogonal polarization state, each state being aligned with internal crystalline axes, and each beam having distinct velocities.

For example, if a uniaxial birefringent crystal has ordinary and extraordinary refractive indices of 2.0 and 2.2, respectively, such a crystal is a positive uniaxial crystal. In this case, the wavelength of an optical beam having its polarization state aligned with one of the ordinary axes is shortened within the crystal by a factor of 2.0 when compared to the wavelength of the optical beam traveling in free space. Similarly, the wavelength of another beam having its polarization state aligned with the extraordinary axis is shortened by a factor of 2.2 when compared to its wavelength in free space.

Figure 21:
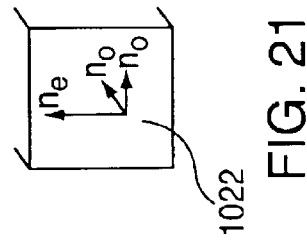
FIG. 21 shows a magnified perspective view of the face of the crystal of FIG. 19, including the orientations of the extraordinary and ordinary axes.
Figure 20:
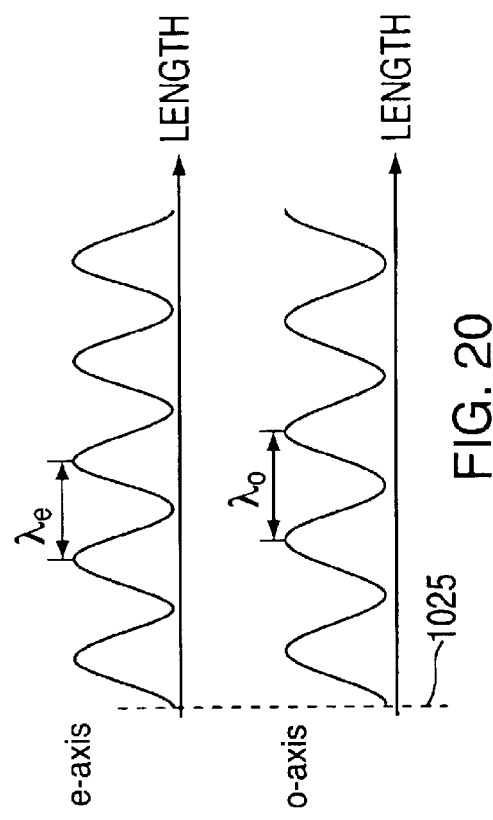
FIG. 20 shows two beams having different wavelengths within the birefringent crystal shown in FIG. 19 according to this invention.

FIG. 20 shows two beams having wavelengths $\lambda_e$ and $\lambda_o$ within crystal 1020. The beam associated with wavelength $\lambda_e$ has its polarization component aligned along the extraordinary crystalline axis while the beam associated with longer wavelength $\lambda_o$ has its polarization component aligned along one of the ordinary axes. Both beams commence propagation at input plane 1025, which corresponds to face 1022, but because their wavelengths differ, the separation between peaks of different beams increases and decreases during propagation through crystal 1020. Thus, the wave on one axis propagates in and out of phase with the wave on the other axis. FIG. 21 shows a magnified perspective view of crystal face 1022, including the orientations of the extraordinary and ordinary axes.

Optical polarization retardation, sometimes simply referred to as retardation, is a measure of phase slip between two polarization component beams. When two orthogonally polarized beams are in phase, the retardation is zero. When the same beams slip by one full wave, the retardation is $2\pi$. Similarly, when the same beams slip by two full waves, the retardation is $4\pi$. Retardation value is typically referred to in modulo $2\pi$. Thus, any number of integral full wave slips corresponds to zero retardation. Optical retardation is thus better used as a measure of the fractional slip in phase between two component optical beams. For example, a half-wave phase slip corresponds to a retardation of $\pi$.

The birefringent beat length, which is another measure of birefringence, is the physical length that corresponds to $2\pi$ retardation. Thus, the birefringent beat length is the free-space optical wavelength at a given optical frequency divided by the birefringence of the crystal. If, for example, the birefringence of a crystal is 2.2–2.0=0.2, then, for a free-space wavelength of 1.5 microns, the birefringent beat length is 1.5/0.2 microns, or 7.5 microns.

Figure 22:
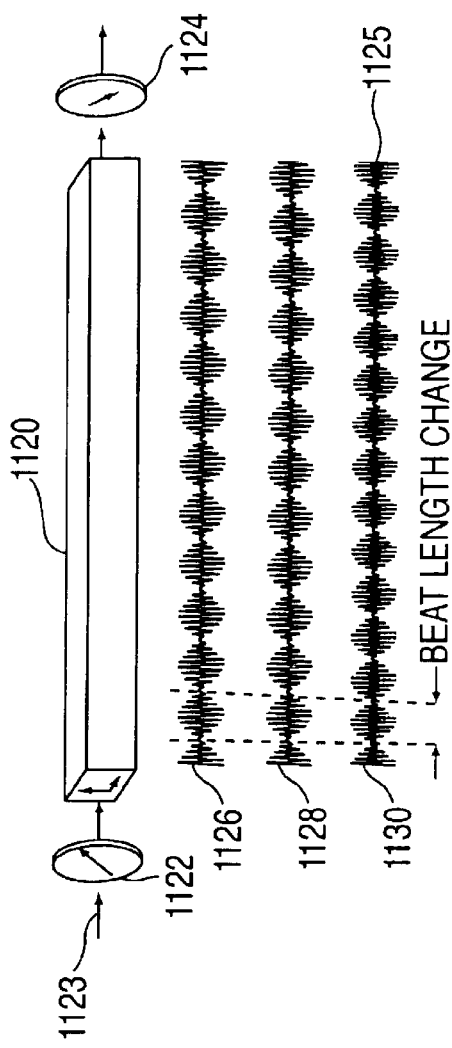
FIG. 22 shows an illustrative apparatus including a birefringent crystal located between two crossed polarizers, as well as three associated beat patterns.

FIG. 22 shows illustrative apparatus including birefringent crystal 1120 located between two crossed polarizers 1122 and 1124. After polarizer 1122 linearly polarizes input beam 1123, the beam propagates through birefringent crystal 1120 and is analyzed by crossed polarizer 1124. Below the apparatus, FIG. 22 also shows beat patterns 1126, 1128, and 1130. Each beat pattern illustrates the beat between orthogonal polarization components of an optical beam through the crystal. The beat lengths of beat patterns 1126, 1128, and 1130 correspond to the birefringent beat lengths at three different optical frequencies. It will be appreciated that the optical intensity does not periodically vary through the crystal and that beat patterns 1126, 1128, and 1130 are merely for illustrative purposes.

Patterns 1126 and 1130 show that an integral number of birefringent beats can exist in a birefringent crystal. In contrast, pattern 1128 shows that there can be residual retardation (some fraction of a birefringent beat) remaining at the end of the crystal. The residual retardation corresponds to the optical retardation that remains after the integral number of birefringent beats is subtracted. Also, as demonstrated by the dashed lines in FIG. 22, a higher number of beats within crystal 1120 occurs as the optical frequency of the beam increases (i.e., the wavelength decreases).

Figure 23:
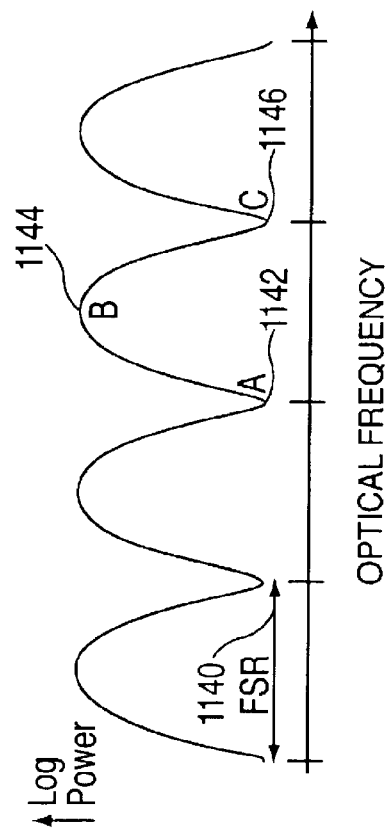
FIG. 23 shows how the optical intensity varies through the last polarizer of FIG. 22 as a function of optical frequency.

FIG. 23 shows how the optical intensity varies through analyzer 1124 as a function of optical frequency. When the beat pattern at crystal termination (end face) 1125 is maximized (e.g., trace 1126), the transmitted intensity 1142 through polarizer 1124 is minimized. Similarly, intensity 1144 is maximized at termination 1125 when the beat terminates at a minimum (e.g., trace 1128). Further increase of the optical frequency can restore the maximized beat pattern and corresponding minimized transmitted intensity 1146 (e.g., trace 1130), albeit with an additional beat along the crystal length.

Thus, as shown in FIG. 23, as the optical frequency changes, an optical intensity through analyzer 1124 traces a periodic waveform. The frequency separation between points 1142 and 1146 is the free-spectral range (hereinafter, "FSR") of crystal 1120.

For example, the birefringence of a $YVO_4$ crystal at 1.55 microns is approximately 0.214. The beat length is therefore 1.55/0.214~7.25 microns. A $YVO_4$ crystal that is 14.022 mm long generates an FSR of about 100 GHz—a convenient telecommunications value. Thus, within this crystal there are approximately 1935 birefringent beat lengths from input face to output face.

Figure 24:
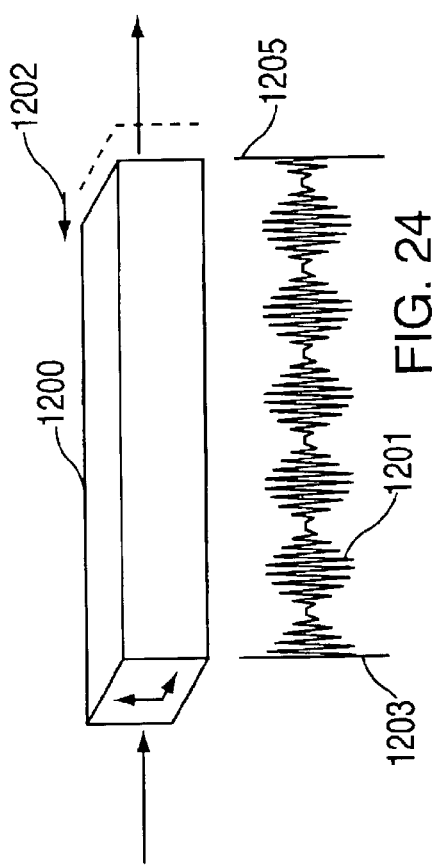
FIG. 24 shows a perspective view of an illustrative birefringent crystal having a length error.

It will be appreciated that the fabrication of any crystal will result in some degree of length error. When a birefringent crystal has an error in its length, the number of birefringent beats and the residual retardation can change when compared to the same crystal having zero error. FIG. 24 shows a perspective view of illustrative birefringent crystal 1200 having length error 1202. In this case, crystal 1200 is shorter than predicted. Accordingly, output plane 1205 is moved towards input plane 1203, which truncates birefringent beat pattern 1201 and reduces the residual retardation.

Figure 25:
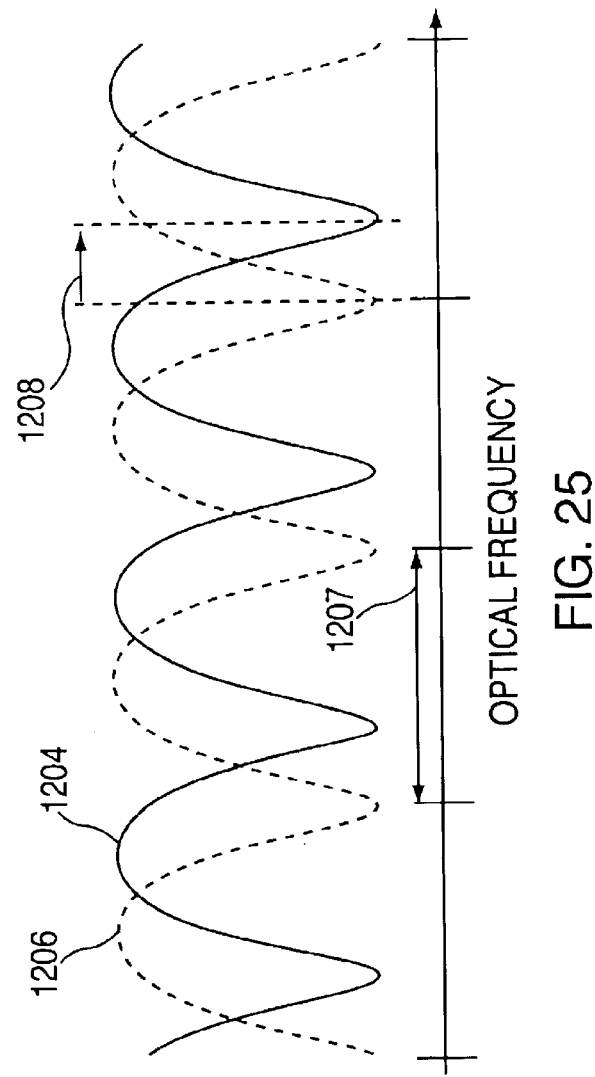
FIG. 25 shows the effect of a crystal length error according to this invention.

FIG. 25 shows the effect of a crystal length error. In particular, frequency response 1204, which corresponds to crystal 1200, is shifted upward from predicted frequency response 1206 by frequency error 1208. It will be appreciated that if length error 1202 is small compared to the integral number of birefringent beats multiplied by the birefringent beat length, then free-spectral range 1207 is not substantially altered.

Because the intensity spectrum is periodic, a phase shift can be defined as frequency error 1208 divided by free-spectral range 1207. A phase error is that phase shift which is associated with a length error. A retardation error is the difference between the anticipated retardation and that retardation realized due to a length error. A phase error of an optical spectrum directly correlates to a retardation error within a birefringent crystal.

A particular difficulty with the fabrication of high-birefringent crystals with precise phase control is the short beat length of such crystals. In the above example, the beat length was approximately 7.25 microns. To fabricate a crystal that is 14.022 mm long to within 7.25 micron precision requires the ability to measure the crystal length to approximately one part in 2,000. However, a 7.25 micron error results in nearly a $2\pi$ band of phase error.

To reduce the nearly $2\pi$ band of phase error to, for example, a $\pi/5$ phase error band, the crystal length would have to be controlled to within 0.725 microns. A 0.725 micron length tolerance is difficult to measure and difficult to achieve. As an illustration of the difficulty involved, most modern high-birefringent crystals are polished to within approximately +/-5.0 microns of the target length.

The use of a low-birefringent crystal in combination with a high-birefringent crystal can result in a lower overall phase error. A useful low-birefringent crystal is crystalline quartz, which has a birefringence $\Delta n \sim 0.0084$. The $\Delta n$ ratio between $YVO_4$ and quartz is about 25:1. The birefringent beat length in crystalline quartz is therefore about 25 times longer than in $YVO_4$.

Figure 26:
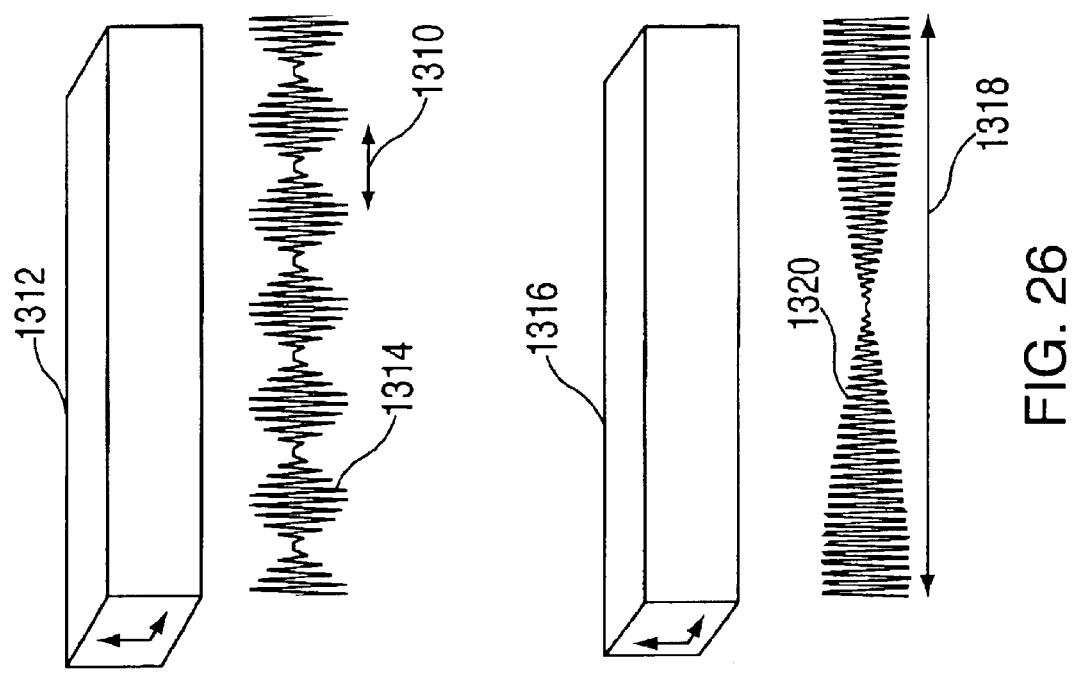
FIG. 26 compares the phase tolerance of an illustrative high-birefringent crystal and an illustrative low birefringent crystal 1316 according to this invention.

FIG. 26 compares the phase tolerance of high-birefringent crystal 1312 (e.g., $YVO_4$) and low birefringent crystal 1316 (e.g., quartz). Beats 1314 within crystal 1312 have a relatively short beat length 1310 and beats 1320 within crystal 1316 have a relatively long beat length 1318. Thus, for the same crystal length tolerance during fabrication, a crystal with lower birefringence will have higher phase tolerance.

The combination of a high birefringent crystal with low phase tolerance and a low-birefringent crystal with high phase tolerance can result in an overall system with high phase tolerance. As such, a low-birefringent crystal can be used as a phase compensator for a highly birefringent crystal. Accordingly, a phase compensator can be one or more low-birefringent crystals that substantially correct for the phase error of one or more high-birefringent different crystals.

FIG. 27 shows an illustrative high-birefringent crystal 1400 (having length error 1401) and low-birefringent crystal 1402. The extraordinary axis 1408 of crystal 1400 and extraordinary axis 1409 of crystal 1402 are preferably either parallel or perpendicular to one another.

FIG. 28 shows two independent intensity spectra 1410 and 1412 corresponding to crystals 1400 and 1402, respectively. As shown, the slope of spectrum 1412 is negative, and when added to intensity spectrum 1410, resultant spectrum 1414 (shown in FIG. 29) is effectively shifted to the left (a lower frequency). Thus, retardation 1406 of crystal 1402 adds to residual retardation 1404 of crystal 1400, such that the overall retardation is greater than that of high birefringent crystal 1400 alone. Thus, composite intensity spectrum 1414 is effectively shifted to lower frequencies.

Figure 30:
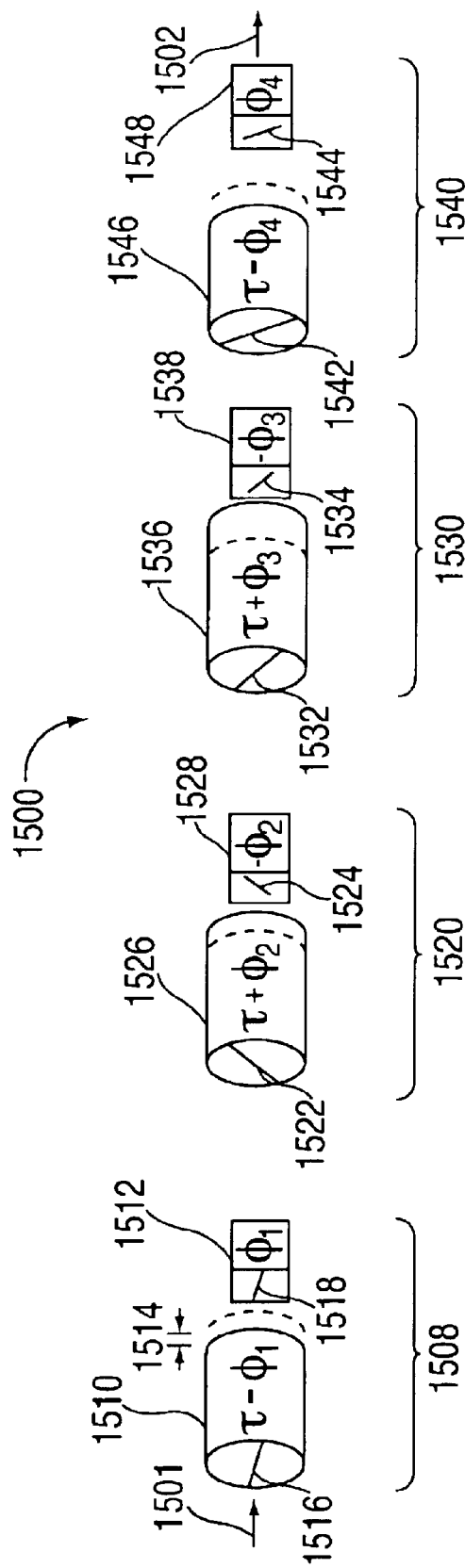
FIG. 30 shows a schematic diagram of an illustrative four-stage coherent PMD generator according to this invention.

FIG. 30 illustrates four-stage coherent PMD generator 1500 according to this invention, including input and output optical beams 1501 and 1502. It will be appreciated, however, that the number of stages is not limited to four.

Generator 1500 includes four birefringent stages 1508, 1520, 1530, and 1540, each of which includes a high-birefringent element and a respective low-birefringent element that is selected to minimize the optical retardation error of the high birefringent element (i.e., the stage). In this particular embodiment, the high birefringent elements have substantially the same DGD values $\tau$, but, in general, each element can have any DGD value that is an integral multiple of a unit DGD value. Stage 1508, for example, includes high-birefringent element 1510, which has length error 1514, and low birefringent element 1512. Length error 1514 introduces an optical retardation error $\phi_1$, which is compensated by selection of phase-compensating low birefringent element 1512 having residual retardation $+\phi_1$.

It will be appreciated that a birefringence error of the material that makes up element 1510 rather than length error 1514 can also introduce residual retardation error $\phi_1$. Likewise, residual retardation $+\phi_2$ of element 1526 is mitigated by residual retardation $-\phi_2$ Of selected element 1528; residual retardation $+\phi_3$ of element 1536 is mitigated by residual retardation $-\phi_3$ of selected element 1538; and residual retardation $-\phi_4$ of element 1536 is mitigated by residual retardation $+\phi_4$ of selected element 1538.

To avoid polarization mode-mixing between high birefringent element 1510 and low birefringent element 1512, extraordinary axis 1516 of element 1510 can be aligned substantially parallel to extraordinary axis 1518 of element 1512. Alternatively, extraordinary axes 1516 and 1518 can be aligned substantially perpendicular to one another, as long as the residual optical retardation $\phi_1$ of high birefringent element 1510 remains mitigated.

Similarly, to avoid polarization mode-mixing between high and low birefringent elements, stage 1520 can have extraordinary axis 1522 of high birefringent element 1526 and extraordinary axis 1524 of low birefringent element 1528 aligned in a substantially parallel or perpendicular fashion. Stage 1530 has extraordinary axis 1532 of high birefringent element 1536 and extraordinary axis 1534 of low birefringent element 1538 aligned in a substantially parallel or perpendicular fashion. Furthermore, stage 1540 has extraordinary axis 1542 of high birefringent element 1546 and extraordinary axis 1544 of low birefringent element 1548 aligned in a substantially parallel or perpendicular fashion.

To induce a degree of polarization mode-mixing between adjacent stages, relative rotation of extraordinary axes is required. For example, extraordinary axis 1522 of stage 1520 can be rotated with respect to extraordinary axis 1516 of stage 1508.

It will be appreciated that each stage of generator 1500 can include more than one high-birefringent element. When a high-birefringent element includes a single birefringent crystal, the crystal can be chosen such that it generates any desired free-spectral range. When two or more crystals are combined in a single stage, the combination can be chosen to optimize one or more physical attributes, including, for example, the free-spectral range, the optical retardation temperature coefficient, the thermal expansion coefficient, and any combination thereof. For example, a high birefringent stage may be constructed using a $YVO_4$ crystal and a $LiNbO_3$ crystal with extraordinary axes aligned. The length ratio of $YVO_4$ to $LiNbO_3$ crystals can be selected to minimize the temperature dependence of the optical retardation for the combined crystals.

FIG. 31 shows another illustrative coherent PMD generator 1600 according to this invention, which includes birefringent stages 1605, 1606, 1607, and 1608. Generator 1600 is similar to generator 1500, with two exceptions. First, extraordinary axes 1615, 1616, 1617, and 1618 of high birefringent elements 1610, 1611, 1612, and 1613, respectively, are substantially parallel (although they can also be substantially perpendicular). Second, half-wave waveplates 1620, 1621, and 1622 are located between stages 1605, 1606, 1607, and 1608, respectively, to control mode-mixing.

The PMD added to output beam 1602 is controlled by rotation of birefringent axes 1625, 1626, and 1627 of half-wave waveplates 1620, 1621, and 1622, respectively. Rotation is preferably about an axis substantially parallel to beam 1601. In some ways, generator 1600 is easier to build than generator 1500 because the birefringent axes of the four stages are aligned and fixed in place while the half-wave waveplates are rotated.

FIG. 32 shows yet another illustrative PMD generator 1650, which is like generator 1600, except that electro-optic elements, rather than half-wave waveplates, are used to polarization mode-mix. Electro-optic element 1640 is located between birefringent stages 1605 and 1606, element 1641 is located between birefringent stages 1606 and 1607, and element 1642 is located between birefringent stages 1607 and 1608. Like generator 1600, extraordinary axes 1615, 1616, 1617, and 1618 of high birefringent elements 1610, 1611, 1612, and 1613 are substantially parallel.

During operation, mode-mixing can be induced by orienting electro-optically induced birefringent (hereinafter, "principal") axis 1644 in a fashion that is neither parallel nor perpendicular to extraordinary axis 1615. For example, principal axis 1644 can be aligned at 45 degrees with respect to extraordinary axis 1615, such that both axes lie within a plane substantially perpendicular to beam 1601. Similarly, principal axis 1646 can be aligned at 45 degrees to extraordinary axis 1616, and principal axis 1648 can be aligned at 45 degrees to extraordinary axis 1617.

Control voltages V1, V2, and V3 control the optical retardations generated by electro-optic elements 1640, 1641, and 1642, respectively. The PMD generated at output 1602 by generator 1650 is controlled by control voltages $V_1$, $V_2$, and $V_3$ of electro-optic elements 1640, 1641, and 1642. Generator 1650 can be operated at a higher speed than generator 1600 because a change of control voltages $V_1$, $V_2$, and $V_3$ can be faster than rotation of half-wave waveplates 1620, 1621, and 1622.

For example, electro-optic elements 1640, 1641, and 1642 can be made using $LiNbO_3$ crystals. The extraordinary axis of the $LiNbO_3$ crystal can be cut such that the axis is substantially parallel to beam 1601. This cut eliminates additional optical retardation imparted to beam 1601 when no voltage is applied. The x-axis of the $LiNbO_3$ crystal can be cut, and electrical contacts can be located on the crystal, such that the electro-optically induced principal axis lies at a 45 degree angle with respect to an applied electric field and lies in a plane that is perpendicular to the extraordinary axis.

It will be appreciated that although generators 1500, 1600, and 1650 each include four birefringent stages having substantially zero optical retardation, any number of stages can be used as long as: (1) the respective DGD values τ are either the same or an integral multiple of a unit DGD value and (2) the residual optical retardation value of each stage divided by its DGD value is substantially the same.

Colorless, Coherent PMD Generation

As used herein, a colorless, coherent PMD generator is capable of generating the same PMD value on any optical channel along a wavelength-division multiplexed comb of optical signals that are equally spaced in frequency. Coherent PMD generators can be made colorless by selecting an appropriate unit DGD value and residual optical retardation value for each birefringent stage.

The unit DGD value is preferably the multiplicative inverse of the frequency separation between adjacent WDM channels. Also, the residual optical retardation of each birefringent stage is preferably chosen to generate a PMD spectrum with a desirable alignment between any definable center frequency of the DGD spectrum and a definable frequency of the WDM comb spectrum.

Figure 33:
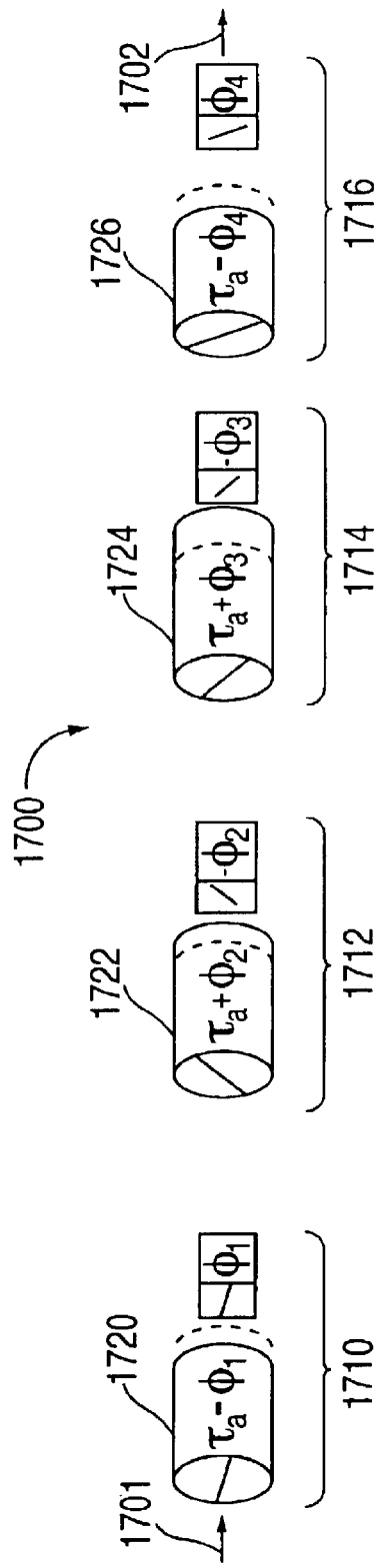
FIG. 33 shows non-colorless coherent PMD generator that includes four birefringent stages according to this invention.
Figure 34:
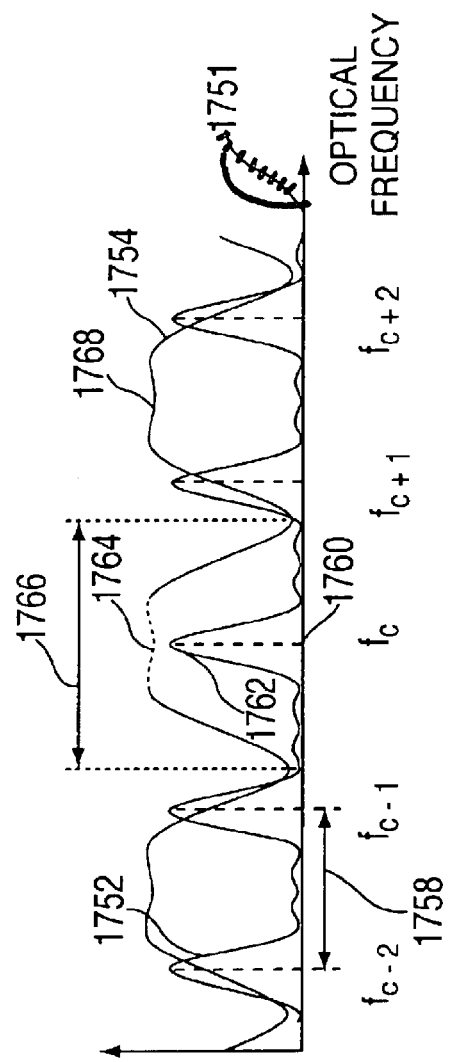
FIG. 34 shows an illustrative DGD spectrum and an illustrative WDM comb channel spectrum, both as a function of optical frequency according to this invention.

FIG. 33 shows non-colorless coherent PMD generator 1700, which in this case includes four birefringent stages 1710, 1712, 1714, and 1716, although a different number of stages can be used. The DGD value $\tau_a$ of high birefringent stages 1720, 1722, 1724, and 1726 yield a free-spectral range of the generated DGD spectrum at output 1702. FIG. 34 includes DGD spectrum 1754 and WDM comb channel spectrum 1752, both as a function of optical frequency 1751. WDM spectrum 1752 has a channel separation 1758 and DGD spectrum has a free-spectral range 1766. When $\tau_a$ is not a multiplicative inverse of channel spacing 1758, or some integral multiple thereof, the spectral periodicities of DGD spectrum 1754 and WDM comb spectrum 1752 do not match.

Accordingly, DGD value 1764 of spectrum 1754 can coincide at frequency 1760 with power value 1762 at a maximum of WDM comb spectrum 1752, but point 1768 of DGD spectrum 1754 does not correspond to another maximum along WDM comb spectrum 1752. Therefore, generator 1700 is not colorless because the PMD generated at output 1702 is not the same for all channels along a WDM comb spectrum.

Figure 35:
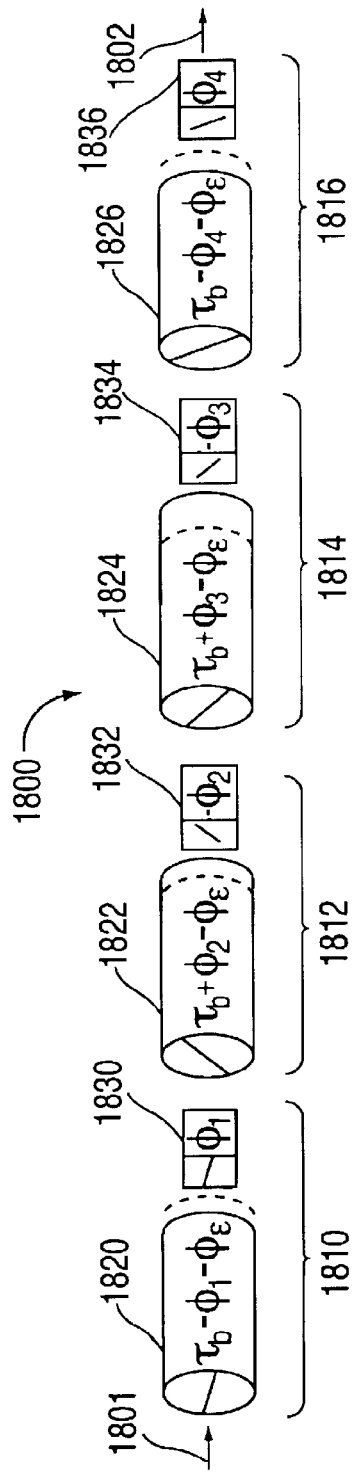
FIG. 35 shows an illustrative colorless, coherent PMD generator, with an input optical beam and an output optical beam according to this invention.

FIG. 35 shows illustrative colorless, coherent PMD generator 1800, with input optical beam 1801 and output optical beam 1802. As described more below, the PMD spectrum generated by generator 1800 is frequency-shifted compared with generator 1700. Generator 1800 includes four birefringent stages 1810, 1812, 1814, and 1816, but any number of stages can be used according to this invention. High-birefringent stages 1820, 1822, 1824, and 1826 have the same DGD value $\tau_b$, which yields a generated DGD spectrum that is periodic and has a free-spectral range. DGD value $\tau_b$ can be the multiplicative inverse of channel separation 1868, or any integral multiple thereof.

Figure 36:
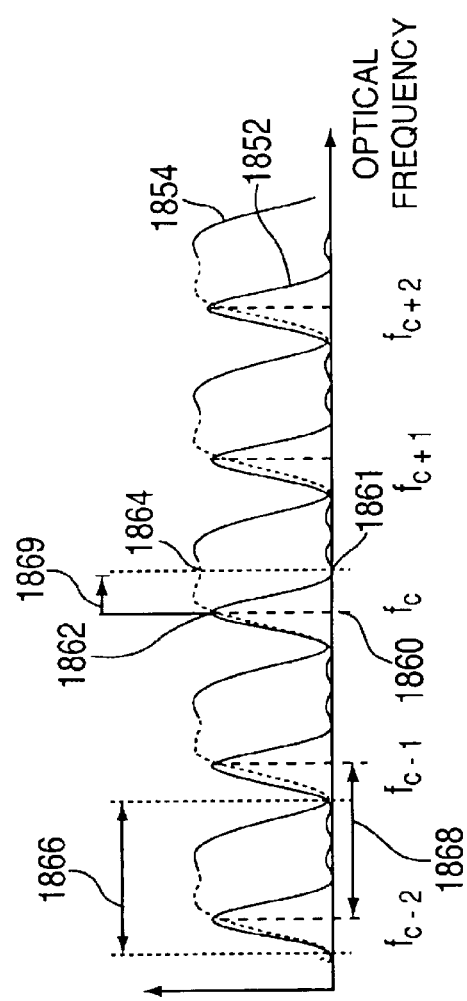
FIG. 36 shows an illustrative DGD spectrum and an illustrative WDM comb channel spectrum, both as a function of optical frequency, associated with the generator of FIG. 35 according to this invention.

FIG. 36 shows the frequency-dependence of DGD spectrum 1854 and WDM comb channel spectrum 1852. Unlike free-spectral range 1766, free-spectral range 1866 of the DGD spectrum is substantially equal to channel separation 1868 of the channel spectrum. Because the periodicities of DGD spectrum 1854 and WDM comb spectrum 1852 essentially the same, generator 1800 is colorless.

Although the periodicities of DGD spectrum 1854 and WDM comb spectrum 1852 are essentially the same, their phase relationship may not be desirable. In other words, a predetermined center frequency of the DGD spectrum and a predetermined frequency of the WDM comb spectrum could have an undesirable frequency difference. For example, in FIG. 36, optical frequency 1861 (corresponding to DGD value 1864 of spectrum 1854, which may be a desirable center frequency of the DGD spectrum) and frequency 1860 (corresponding to maximum-power point 1862 along WDM comb spectrum 1852) do not substantially coincide. The difference between optical frequencies 1860 and 1861 (hereinafter, "frequency error" 1869) measures the spectral misalignment between spectra 1852 and 1854.

Frequency error 1869 is the result of optical retardation error $-\phi_\epsilon$ present in birefringent stages 1820, 1822, 1824, and 1826 and is not compensated with phase compensators 1830, 1832, 1834, and 1836. Frequency error 1869 divided by channel separation 1868 and multiplied by $2\pi$ yields a phase value, where the phase value is equal to the optical retardation error $-\phi_e$. Thus, generator 1800 is colorless, but the frequency error between resultant DGD and WDM comb spectra can yield an undesirable PMD spectrum alignment with the WDM channels.

Figure 37:
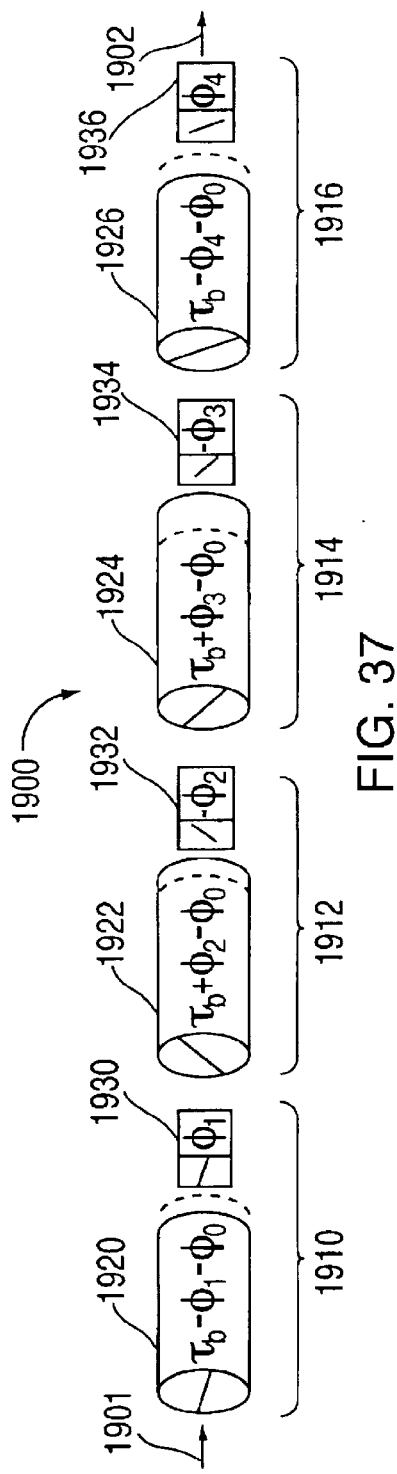
FIG. 37 shows illustrative colorless and frequency-aligned coherent PMD generator according to this invention.

FIG. 37 shows illustrative colorless and frequency-aligned coherent PMD generator 1900, with input optical beam 1901 and output optical beam 1902. Generator 1900 includes four birefringent stages 1910, 1912, 1914, and 1916, but it will be appreciated that any number of stages can be used according to this invention. The four stages have the same DGD value $\tau_b$, which yields a generated DGD spectrum that is periodic and has a free-spectral range. As discussed above, DGD value $\tau_b$ can be the multiplicative inverse of channel separation 1868, or any integral multiple thereof.

Figure 38:
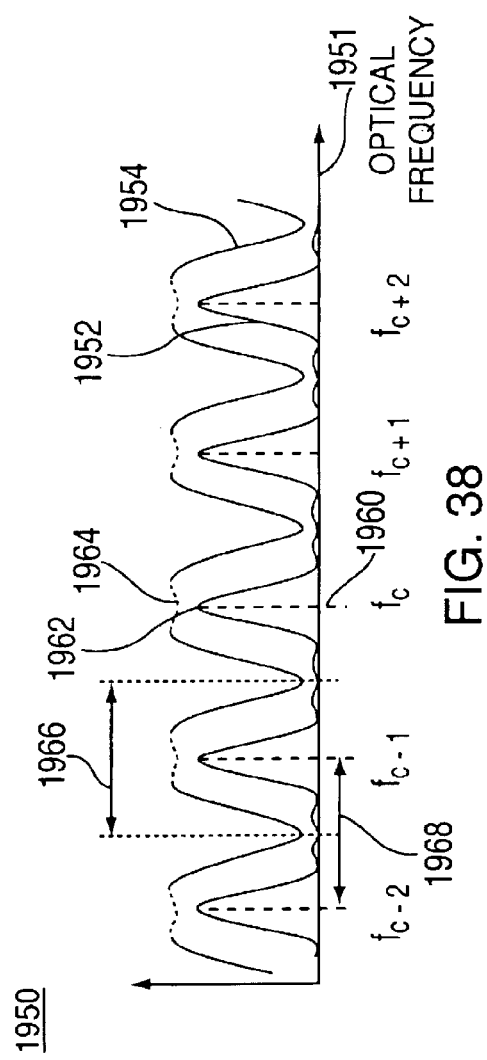
FIG. 38 shows an illustrative DGD spectrum and an illustrative WDM comb channel spectrum, both as a function of optical frequency, associated with the generator of FIG. 37 according to this invention.

FIG. 38 shows illustrative DGD spectrum 1954 and WDM comb channel spectrum 1952, both as a function of optical frequency 1951, which can be generated by generator 1900. As already discussed above, free-spectral range 1966 and period 1968 of spectra 1952 and 1954, respectively, are essentially the same by selecting a DGD value $\tau_b$ to be the multiplicative inverse of channel separation 1968.

By selecting an appropriate optical residual retardation value $\phi_0$ of birefringent stages 1920, 1922, 1924, and 1926, alignment can be achieved between DGD value 1964 and power maximum 1962 at optical frequency 1960. It will be appreciated that residual optical retardation $\phi_0$ of a stage (i.e., stage 1910, 1912, 1914, or 1916) can reside in a high birefringent element (i.e., element 1920, 1922, 1924, or 1926), in phase compensator elements (i.e., element 1930, 1932, 1934, and 1936), or some combination of elements. In accordance with this invention, when the residual optical retardation $\phi_0$ is chosen such that the generated DGD and the WDM comb spectra are desirably aligned (or "locked"), phase compensator elements 1930, 1932, 1934, and 1936 are referred to as phase-locking element elements.

Thus, generator 1900 can generate a colorless and phase-locked PMD spectrum. The colorless property is achieved by selecting DGD value $\tau_b$ to be the multiplicative inverse of the channel spacing of a WDM comb spectrum (or any integral multiple thereof) and by selecting the residual optical retardation value $\phi_0$ to achieve an appropriate phase relationship—namely, one in which there is no discernable frequency shift between generated DGD spectrum and the WDM comb.

Independent First- and Second-Order PMD Generation

According to one aspect of this invention, a coherent PMD spectrum can be generated using any number of birefringent stages having harmonic DGD values and coherent residual retardation values, regardless of the degree of polarization mode-mixing present between the stages.

According to another aspect of this invention, independent generation and control of first and second order PMD (at an optical frequency within each DGD spectral period) can be achieved when the generator includes four harmonic birefringent stages having substantially the same residual optical retardations and is operated in a special way. First, control of the degree of polarization mode-mixing between first and second stages, and the degree of polarization mode-mixing between the third and fourth stages is linked. Second, control of the degree of polarization mode-mixing between the second and third stages is coordinated with respect to the other degrees of mode-mixing. As discussed more fully below, control algorithms or look-up tables can be used to coordinate the degrees of polarization mode-mixing in a repeatable and reliable way.

As mentioned earlier, ISFO generator 300 can be used to generate first order PMD and second order PMD at optical frequency 410. Frequency 410 can correspond to a maximum DGD value along any DGD spectrum, and particularly at any optical frequency that is shifted from the maximum DGD value by an amount equal to an integer multiplied by the free-spectral range. Thus, in the case of generator 300, controller 326 is used to control mode-mixing elements 320 and 324, and controller 328 controls mode-mixing elements 322. It will be appreciated that the degree of mode-mixing between stages can also be controlled by varying the orientation of the stages themselves, thereby eliminated the need for a physical element between the stages.

Figure 39:
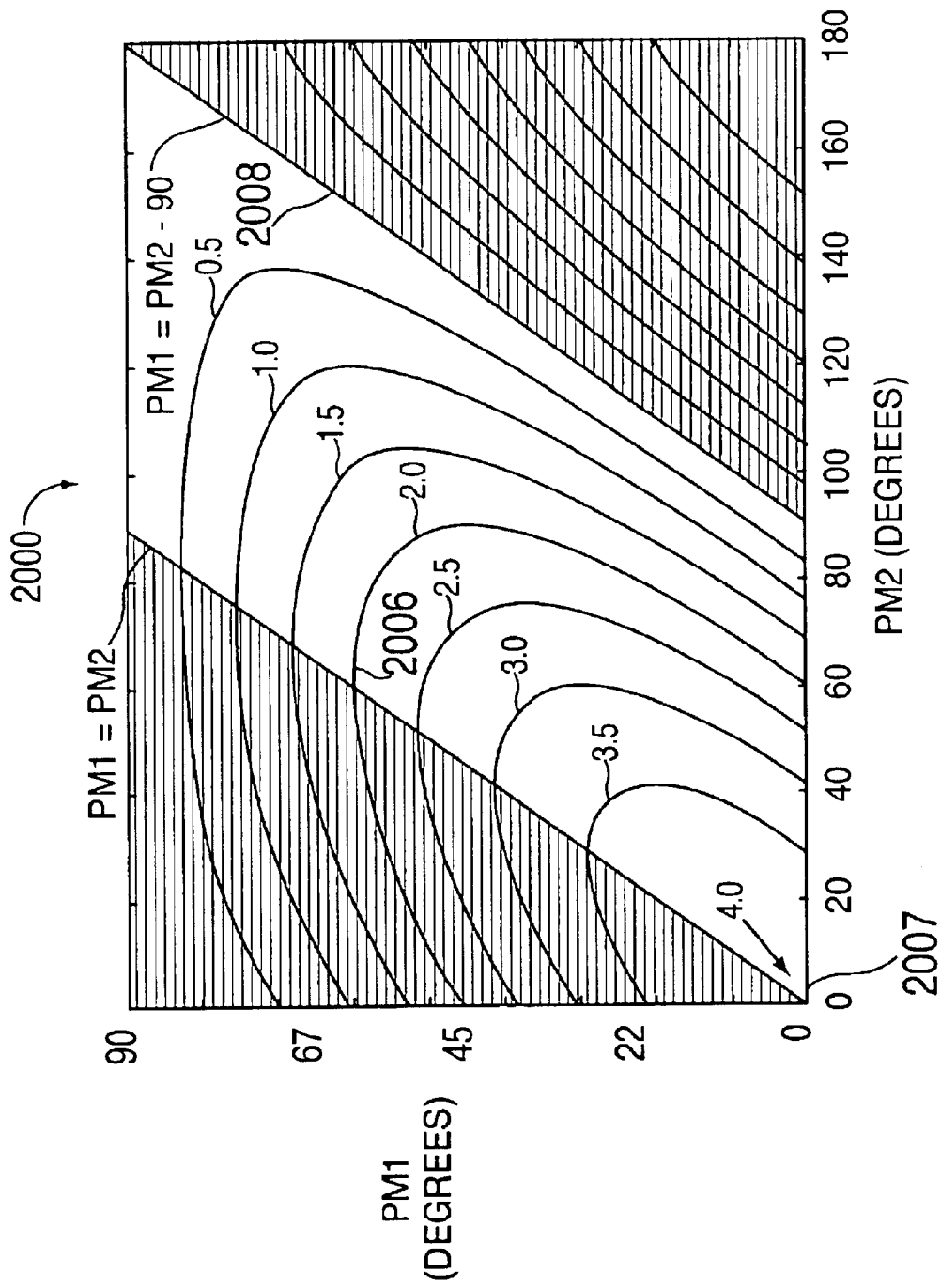
FIG. 39 shows a chart that includes a set of constant DGD value contours that can be generated using a PMD generator according to this invention.

FIG. 39 shows chart 2000. The distances along the horizontal and vertical axes, which can be measured in degrees, can represent the angle between the extraordinary axes of adjacent birefringent stages, as shown in FIG. 9. More generally, the distances represent one-half of the angle subtended on the Poincaré sphere due to mode-mixing between adjacent stages. The mode-mixing can be produced by physical rotation of the birefringent stages themselves, insertion of waveplates (e.g., half-wave waveplates) between the stages, and insertion of electro-optic elements between the stages. When half-wave waveplates are used, the horizontal and vertical distances measure twice the angle of the waveplate extraordinary axis rotation. When electro-optic elements are used, the horizontal and vertical distances measure one-half the optical retardation imparted by the elements.

In particular, the distance along the horizontal axis (hereinafter, "PM2") represents the amount of mode-mixing between stages 306 and 307. Similarly, the distance along the vertical axis (hereinafter, "PM1") represents the amount of mode-mixing between stages 305 and 306, as well as stages 307 and 308.

FIG. 39 includes a set of constant DGD value contours that can be generated using a PMD generator according to one aspect of this invention. Thus, each contour represents a set of PM1/PM2 combinations that will generate a predetermined DGD value at a particular optical frequency within the free-spectral range of the spectrum.

Indicated DGD values 0.5–4.0 on chart 2000 are normalized DGD values. The actual DGD value produced by generator 300 is equal to the product of the normalized DGD value indicated on chart 2000 and the birefringent stage DGD value $\tau$ of any DGD element (e.g., element 310). For example, all PM1/PM2 combinations along contour 2006 generate a normalized DGD value of 2 (actual DGD value is equal to 2 times the DGD value of a birefringent stage). Similarly, all PM1/PM2 combinations along contour 2007 generate a normalized DGD value of 4, which in this case is just the point (0, 0). Finally, PM1/PM2 combinations along contour 2008 generate normalized DGD value 0, where PM1=PM2–90 degrees.

Although not wishing to be bound by any particular theory, it is believed that the DGD contours (such as the contours of chart 2000) can be determined by the following equation:

$$\tau_{300}=4\tau|\cos(PM1)|\times|\cos(PM2-PM1)|$$

where $\tau_{300}$ is the DGD value at optical frequency 410 produced by generator 300 and $\tau$ is the DGD value of a birefringent stage.

Figure 40:
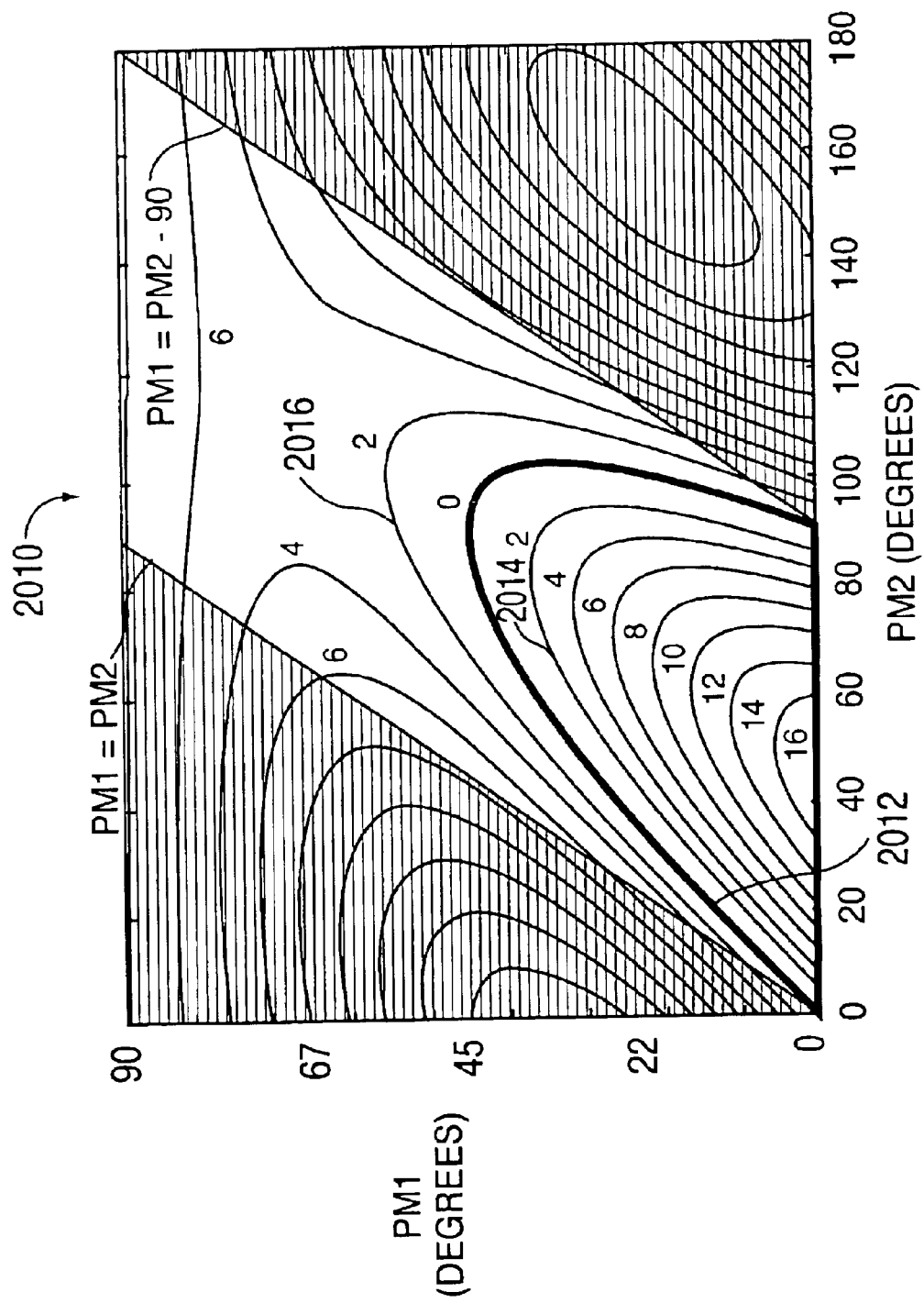
FIG. 40 shows a chart that includes a set of constant SOPMD value contours that can be generated using a PMD generator according to this invention.

FIG. 40 includes a set of constant SOPMD value contours that can be generated using a PMD generator according to one aspect of this invention. Thus, each contour represents a set of PM1/PM2 combinations that will generate a predetermined SOPMD value at a particular optical frequency within the free-spectral range of the spectrum.

Indicated SOPMD values 0–16 on chart 2010 are normalized SOPMD values. Thus, the actual SOPMD value produced by generator 300 is equal to the product of the normalized SOPMD value indicated on chart 2010 and the birefringent stage DGD value τ of any DGD element (e.g., element 310). A contour includes a set of PM1/PM2 combinations that generate the same SOPMD magnitude at optical frequency 410. For example, all PM1/PM2 combinations along contour 2014 generate a normalized SOPMD magnitude of 2.

Darkened boundary contour 2012 includes a special set of PM1/PM2 combinations because all SOPMD magnitude contours within boundary contour 2012 change monotonically. Also, boundary 2012 covers the full normalized SOPMD magnitude range, from 0–16. For example, contour 2014 shows a set of PM1/PM2 combinations that generate a normalized SOPMD magnitude of 2. Contour 2016 shows another set of PM1/PM2 combinations that generate a normalized SOPMD magnitude of 2. However, no PM1/PM2 combination within boundary contour 2012 produce contours having the same SOPMD magnitude value. When the SOPMD contour is monotonic, it can simplify the control of an IFSO PMD generator within a feedback control loop, such as a PMD compensator.

The SOPMD contours on chart 2010 were obtained from the numerical modeling of generator 300. Alternatively, and not wishing to be bound by any particular theory, it is believed that the SOPMD contours can also be analytically determined at optical frequency 410 as follows:

$$|\tau_w|=\tau^2 \times \sqrt{(\tau_{1w}^2+\tau_{2w}^2+\tau_{3w}^2)},$$

where $$\tau_{1w}=-(1+\cos(PM1))(1+\cos(PM2-PM1)),$$

$$\tau_{2w}=(1+\cos(PM1))(\sin 2(PM2-PM1)+\sin (PM2-PM1))-2\sin (PM1), \text{ and}$$

$$\tau_{3w}=0$$

and where $|\tau_w|$ is the SOPMD value at optical frequency 410 produced by generator 300 and τ is the DGD value of a birefringent stage.

Figure 41:
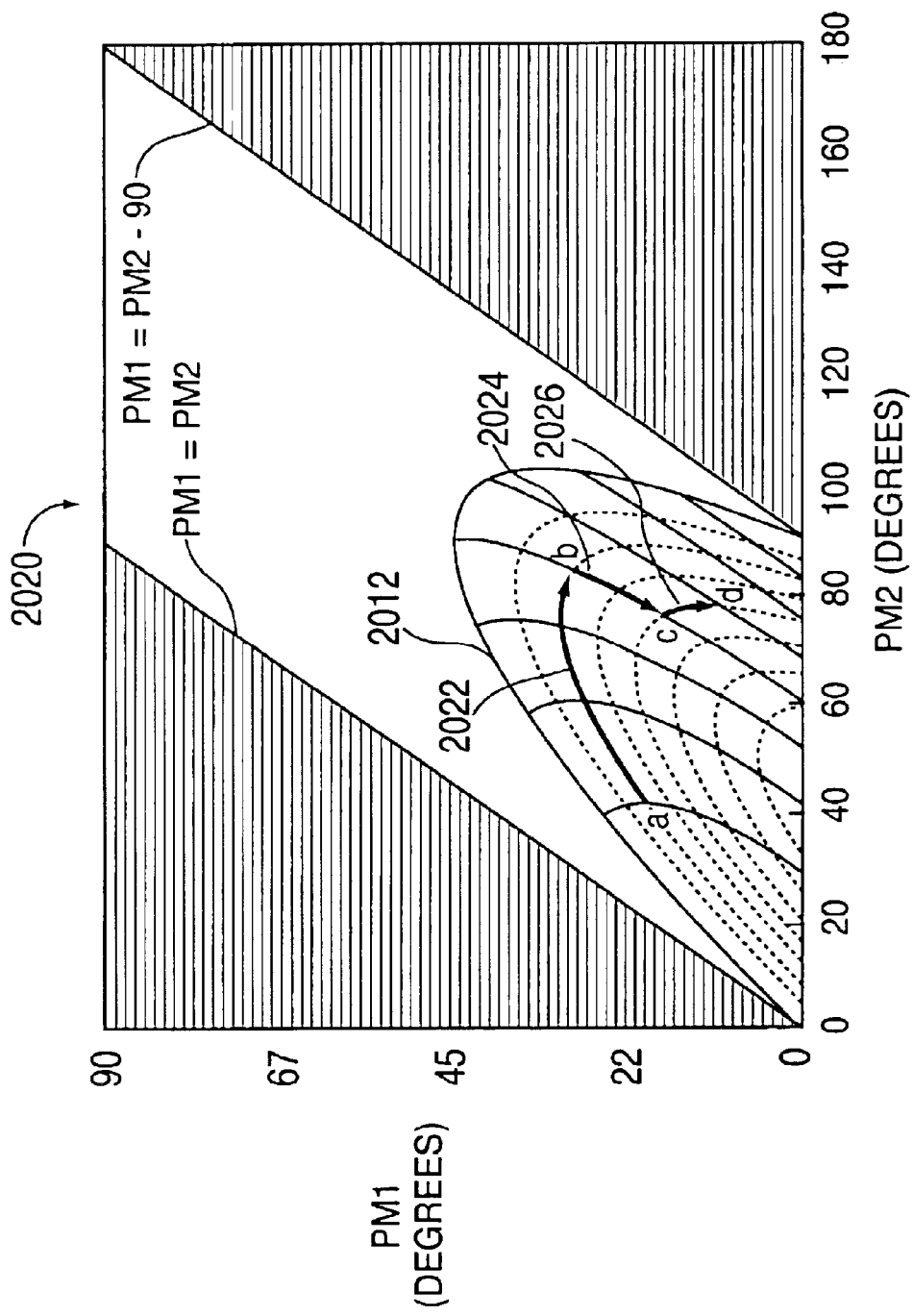
FIG. 41 shows an illustrative chart that includes a set of constant DGD value contours and a set of constant SOPMD magnitude value contours within a boundary contour, all at an optical frequency, according to this invention.

FIG. 41 shows illustrative chart 2020, which includes a set of constant DGD value contours and a set of constant SOPMD magnitude value contours within boundary contour 2012 at an optical frequency. All contours shown in FIGS. 7 and 39–42 are normalized. As mentioned above, both DGD and SOPMD magnitude contours are monotonic within the boundary region. In accordance with this invention, these contours can be used to control first order PMD and second order PMD independently from one another at an optical frequency.

FIG. 41 shows an example trajectory from PM1/PM2 combination a to PM1/PM2 combination d, via combinations b and c. In this case, only first order PMD or second order PMD varies at any given time. It will be appreciated that although all PM1 and PM2 values have been selected to remain within boundary contour 2012 to ensure monotonicity, trajectories that extend outside boundary contour are possible.

Trajectory 2022, which extends from combination a to combination b, follows a contour of constant SOPMD magnitude. Accordingly, the DGD value along trajectory 2022 decreases toward combination b while the SOPMD magnitude is constant. Trajectory 2024, which extends from combination b to combination c, follows a contour of constant DGD value. Accordingly, the SOPMD magnitude along trajectory 2024 increases towards combination c while the DGD value is constant. Finally, trajectory 2026, which extends from combination c to combination d, again follows a contour of constant SOPMD magnitude. Accordingly, the DGD value along trajectory 2026 decreases toward combination d while the SOPMD magnitude is fixed.

Thus, chart 2020 shows one of many possible examples where the PMD which is generated at output 302 is controlled to change DGD with no corresponding change to SOPMD, and likewise is controlled to change SOPMD with no corresponding change to DGD.

Figure 42:
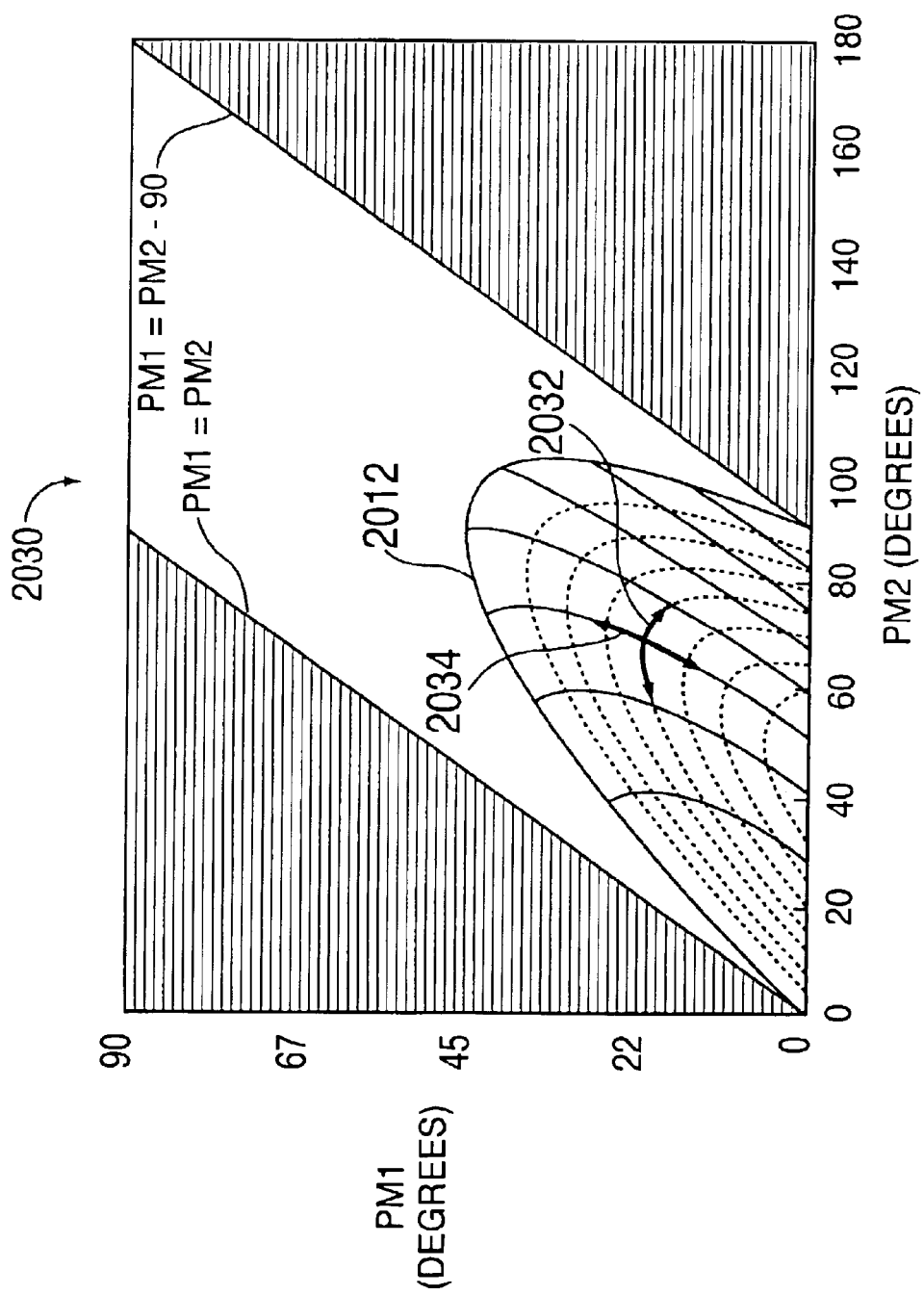
FIG. 42 shows another chart that includes two orthogonal trajectories that can individually, or in combination, be used to form a dither cycle.

FIG. 42 shows chart 2030, which includes two orthogonal trajectories 2032 and 2034 that can individually, or in combination, be used to form a dither cycle. Dithering is a well-known technique for determining the sensitivity of a system's performance to a particular dithered parameter. In the case of an optical network, it is known that the quality of a transmitted pulse depends on first and second order PMD differently. Thus, it would be desirable to identify whether first order PMD or second order PMD was responsible for any degradation in signal quality. Thus, according to another aspect of this invention, one can monitor the response of dithering first order PMD individually, second order PMD individually, or a known combination of both orders.

For example, for one part of a dither cycle, trajectory 2032 varies the output DGD value but not the SOPMD magnitude. For another part of the dither cycle, trajectory 2034 varies the SOPMD magnitude but not the DGD value. A distortion analyzer (not shown) can then be used to measure whether the output signal is more sensitive to the first order (i.e., DGD) dithering or the SOPMD dithering. Once a measurement is made, an error signal can be generated for controlling, for example, the appropriate amounts of first and second order compensatory PMD.

Colorless IFSO PMD Generation

A colorless IFSO PMD generator is a combination of a coherent, colorless PMD generator and an IFSO PMD generator.

As described above, FIG. 8 shows illustrative colorless ISFO generator 600. Generator 600 includes four coherent birefringent stages 605, 606, 607, and 608, each of which has colorless, harmonic DGD element and phase-locking element pairs 610, 611, 612, and 613, respectively. The DGD values of the four DGD elements are substantially the same, and the DGD value is chosen to be the multiplicative inverse of the channel spacing along a WDM comb spectrum. As a result, the period of resultant DGD spectrum (e.g., period 1966 of spectrum 1954) matches the channel separation of a WDM comb spectrum (e.g., channel separation 1968 of spectrum 1952).

The four phase-locking elements are selected to generate four residual optical retardation values that are substantially the same at the output of each colorless-harmonic-DGD and phase-locking element pair, and further where the PMD spectrum on output beam 602 is desirably aligned to a WDM comb. For example, that the frequency corresponding to a maximum along a generated DGD spectrum is substantially the same as a frequency corresponding to a maximum along a WDM comb spectrum.

Polarization mode-mixing elements 620, 622, and 624, are located between stages 605 and 606, 606 and 607, and 607 and 608, respectively. Controller 326 controls polarization mode-mixing elements 620 and 624. Controller 628 controls polarization mode-mixing element 622. Charts 2000, 2010, and 500 (for example) show combinations of first and second order mode-mixing values for mode-mixing elements 620 and 624, and 622, respectively, that produce contours of constant DGD and SOPMD.

Thus, methods and apparatus for coherent PMD generation, colorless coherent PMD generation, independent control of first and second order PMD, and colorless PMD generation having independent control of first and second order PMD are provided. One skilled in the art will appreciate that the present invention can be practiced by other than the described embodiments, which are presented for purposes of illustration and not of limitation. For example, most of the PMD generators according to this invention can be constructed in a folded geometry, as taught by Damask U.S. patent application Ser. No. 09/911,898, filed Jul. 24, 2001, which is hereby incorporated by reference in its entirety. The present invention is limited only by the claims that follow.

What is claimed is:

1. A coherent polarization mode dispersion ("PMD") generator generating a coherent PMD spectrum and comprising:
   at least four birefringent stages in optical series, said stages forming at least three pairs of adjacent stages;
   wherein each of said stages comprises a harmonic differential group delay ("DGD") element and a phase-compensating element; and,
   wherein at least two of said stages have respective residual optical retardation values that are substantially the same.

2. The generator of claim 1 wherein, for each stage, said phase-compensating element has an extraordinary axis and said DGD element has an extraordinary axis that are oriented to avoid polarization mode-mixing within said each stage.

3. The generator of claim 2 wherein, for said each stage, said extraordinary axes have an orientation that is selected from a group consisting of substantially perpendicular and substantially parallel.

4. The generator of claim 1 wherein each of said stages has a total retardation that is an integral multiple of π.

5. The generator of claim 4 wherein, for each of said stages, said DGD element has a retardation error and said phase compensating element has a compensating retardation such that said total retardation is said integral multiple of π.

6. The generator of claim 1 wherein said PMD spectrum comprises a DGD spectrum that has Fourier component frequencies that are in phase.

7. The generator of claim 6 wherein said Fourier component frequencies have a common Fourier-component frequency denominator.

8. The generator of claim 6 wherein said PMD spectrum comprises a DGD spectrum having sinusoidal Fourier components that are all aligned in phase.

9. The generator of claim 6 wherein said DGD spectrum is aligned to a comb of WDM signals.

10. The generator of claim 1 wherein each of said DGD elements has a DGD value that is substantially equal to an integral multiple of a unit DGD value.

11. The generator of claim 10 wherein each of said DGD elements has a DGD value is substantially the same.

12. The generator of claim 10 wherein each of said DGD elements has a different DGD value.

13. The generator of claim 10 wherein said unit DGD value is substantially equal to a multiplicative inverse of a WDM channel spacing.

14. The generator of claim 12 wherein said phase-compensating element is a locked phase-compensating element.

15. The generator of claim 1 wherein said generator is capable of inducing a degree of polarization mode-mixing between at least one of said pairs of stages.

16. The generator of claim 15 wherein each of said stages has a birefringent axis, such that when each of said stages is rotated, said birefringent axis is rotated.

17. The generator of claim 16 wherein each of said stages can be physically rotated about a beam propagation axis of said generator to induce polarization mode-mixing between at least one of said pairs of stages, but not within any of said stages.

18. The generator of claim 15 further comprising a polarization mode-mixing element located between at least one of said pairs of stages.

19. The generator of claim 18 wherein each of said stages has a birefringent axis, and each of said pairs of stages includes a first stage and a second stage, wherein said first stage birefringent axis and said second stage birefringent axis is either substantially parallel or substantially perpendicular.

20. The generator of claim 18 wherein said mode-mixing element comprises at least one waveplate.

21. The generator of claim 20 wherein said at least one waveplate comprises a half-wave waveplate.

22. The generator of claim 21 wherein said half-wave waveplate is rotatable about a beam propagation axis.

23. The generator of claim 20 further comprising at least one waveplate controller coupled to said at least one waveplate for controlling rotation of said at least one waveplate.

24. The generator of claim 18 wherein said mode-mixing element comprises an electro-optic element.

25. The generator of claim 24 wherein said electro-optic element is located between a first pair of said adjacent stages, said first pair comprising a first of said stages and a second of said stages, wherein said electro-optic element has a principal axis and each of said first and second stages has a birefringent axis, and wherein said principal axis is not substantially parallel nor substantially perpendicular to either of said birefringent axes of said first and second stages.

26. The generator of claim 25 wherein said principal axis and said birefringent axes of said first and second stages are at an angle that is about 45 degrees.

27. The generator of claim 18 further comprising at least one mode-mixing element controller coupled to said polarization mode-mixing element for controlling said polarization mode-mixing element.

28. The generator of claim 15 further comprising at least one voltage source for driving said electro-optic element.

29. The generator of claim 15 wherein said at least one pair of adjacent stages comprises every pair of said adjacent stages.

30. The generator of claim 29 wherein at least one of said mode-mixing elements comprises an electro-optic element.

31. The generator of claim 1 wherein each of said DGD elements comprises a birefringent crystal selected from a group consisting of alpha barium borate, yttrium orthovanadate, rutile, lithium niobate, mica, crystalline quartz, and any combination thereof.

32. The generator of claim 1 wherein at least one of said DGD elements comprises a first birefringent crystal having an extraordinary axis and a second birefringent crystal having an extraordinary axis.

33. The generator of claim 32 wherein said extraordinary axes have an orientation that is selected from a group consisting of substantially parallel and substantially perpendicular.

34. The generator of claim 1 wherein at least one of said DGD elements comprises a plurality of birefringent elements.

35. The generator of claim 34 wherein said plurality of birefringent elements are chosen such that at least one physical attribute is optimized, said attribute being selected from a group consisting of a free-spectral range, an optical retardation temperature coefficient, a thermal expansion coefficient, and any combination thereof.

36. A method for generating a coherent polarization mode dispersion ("PMD") spectrum with a PMD generator, said generator comprising at least four birefringent stages in optical series, said stages forming at least three pairs of adjacent stages, wherein each of said stages comprises a harmonic differential group delay ("DGD") element and a phase-compensating element, and wherein each DGD element is characterized by a residual optical retardation that, when divided by a DGD value of its DGD element, is substantially the same for each one of said stages, said method comprising:
passing an input optical beam through said generator; and,
inducing a degree of polarization mode-mixing between at least one adjacent pair of said stages, to generate an output optical beam characterized by a desired PMD spectrum.

37. The method of claim 36 wherein said generator further comprises:
a polarization mode-mixing element located between at least one pair of adjacent stages; and
a mode-mixing element controller coupled to said mode-mixing element, and wherein said inducing comprises causing said controller to vary said degree of mode-mixing.

38. The method of claim 37 wherein said at least one pair of adjacent stages comprises all of said pairs of stages, and wherein said inducing comprises varying said degrees of mode-mixing between all of said pairs of stages.

39. The method of claim 38 wherein at least one of said mode-mixing elements comprises an electro-optic element, and wherein said varying said degree of mode-mixing comprises continuously varying a voltage applied to said electro-optic element.

40. The method of claim 36 wherein each of said stages has an extraordinary axis, and wherein said inducing comprises adjusting said extraordinary axes of adjacent stages until an angle between said axes is substantially 45 degree to induce maximal polarization mode-mixing.

41. The method of claim 36 wherein each of said stages has an extraordinary axis, and wherein said inducing comprises adjusting said extraordinary axes of adjacent stages until an angle between said axes is either substantially parallel or substantially perpendicular to induce substantially zero polarization mode-mixing.

42. The method of claim 36 wherein each of said DGD elements is a colorless DGD element, each of said phase-compensating elements is a locked phase-compensating element, each of said plurality of optical frequencies is an equally spaced channel of a WDM comb spectrum, and wherein said inducing comprises inducing a same amount of DGD at each of said channels.

43. The method of claim 36 wherein each of said DGD elements is a harmonic DGD element, and wherein said inducing comprises generating differential group delay ("DGD") and second order PMD ("SOPMD") independently at at least one optical frequency by inducing varying degrees of polarization mode-mixing between each of said pairs of stages.

44. The method of claim 43 wherein said at least four stages comprises four stages, and said at least three pairs of stages comprises three pairs of stages, and wherein said inducing comprises varying said degrees of mode-mixing between said stages such that DGD and said SOPMD vary according to a predetermined trajectory.

45. The method of claim 44 wherein said predetermined trajectory is selected from a group consisting of a constant DGD trajectory, a constant SOPMD trajectory, a fixed rate of change of a DGD trajectory, a fixed rate of change of a SOPMD trajectory, and any combination thereof.

46. The method of claim 43 wherein said inducing comprising varying said DGD and SOPMD within a DGD/SOPMD space in which said DGD and said SOPMD only vary monotonically between zero and a respective maximum.

47. A coherent polarization mode dispersion ("PMD") generator generating a coherent PMD spectrum, and comprising:
at least four birefringent stages in optical series, wherein each of said stages comprises a harmonic differential group delay ("DGD") element and a phase-compensating element; and,
wherein each one of said stages has a total retardation that is an integral multiple of $\pi$.

48. The generator of claim 47 wherein, for each stage, said phase-compensating element has an extraordinary axis and said DGD element has an extraordinary axis that are oriented to avoid polarization mode-mixing within said each stage.

49. The generator of claim 48 wherein, for said each stage, said extraordinary axes have an orientation that is selected from a group consisting of substantially perpendicular and substantially parallel.

50. The generator of claim 47 wherein, for each of said stages, said DGD element has a retardation error and said phase compensating element has a compensating retardation such that said total retardation is said integral multiple of $\pi$.

51. The generator of claim 47 wherein said PMD spectrum comprises a DGD spectrum having Fourier component frequencies that are in phase.

52. The generator of claim 51 wherein said Fourier component frequencies have a common Fourier-component frequency denominator.

53. The generator of claim 47 wherein each of said DGD elements has a DGD value that is substantially equal to an integral multiple of a unit DGD value.

54. The generator of claim 53 wherein each of said DGD elements has a DGD value is substantially the same.

55. The generator of claim 53 wherein each of said DGD elements has a different DGD value.

56. A coherent polarization mode dispersion ("PMD") generator generating a coherent PMD spectrum, and comprising:
at least four birefringent stages in optical series, said stages forming at least three pairs of adjacent stages;
wherein each of said stages comprises a harmonic differential group delay ("DGD") element and a phase-compensating element; and,
wherein each of said DGD elements has a DGD value that is substantially equal to an integral multiple of a unit DGD value, said DGD value being substantially equal to a multiplicative inverse of a WDM channel spacing.

57. The generator of claim 56 wherein said phase-compensating element is a locked phase-compensating element.

58. The generator of claim 56 wherein said PMD spectrum comprises a DGD spectrum that has Fourier component frequencies that are in phase and wherein said DGD spectrum is aligned to a comb of WDM signals.

59. The generator of claim 56 wherein said generator is capable of inducing a degree of polarization mode-mixing between at least one of said pairs of stages.

60. The generator of claim 59 wherein each of said stages has a birefringent axis, such that when each of said stages is rotated, said birefringent axis is rotated.

61. The generator of claim 60 wherein each of said stages can be physically rotated about a beam propagation axis of said generator to induce polarization mode-mixing between at least one of said pairs of stages, but not within any of said stages.

62. The generator of claim 56 further comprising a polarization mode-mixing element located between at least one of said pairs of stages.

63. The generator of claim 62 wherein each of said stages has a birefringent axis, and each of said pairs of stages includes a first stage and a second stage, wherein said first stage birefringent axis and said second stage birefringent axis is either substantially parallel or substantially perpendicular.

64. The generator of claim 62 wherein said polarization mode-mixing element comprises at least one waveplate.

65. The generator of claim 64 wherein said at least one waveplate comprises a half-wave waveplate.

66. The generator of claim 65 wherein said half-wave waveplate is rotatable about a beam propagation axis.

67. A coherent polarization mode dispersion ("PMD") generator generating a coherent PMD spectrum, and comprising:
   at least four birefringent stages in optical series, said stages forming at least three pairs of adjacent stages;
   wherein each of said stages comprises a harmonic differential group delay ("DGD") element and a phase-compensating element; and,
   wherein each of said stages has a birefringent axis, and each of said pairs of stages includes a first stage and a second stage, wherein said first stage birefringent axis and said second stage birefringent axis is either substantially parallel or substantially perpendicular.

68. A polarization mode dispersion ("PMD") generator generating a coherent PMD spectrum, and comprising a series combination of:
   a first stage comprising:
      a first differential group delay ("DGD") element receiving an optical signal and applying first DGD to the optical signal;
   a first polarization mode mixing element optically coupled to the first stage and applying a first degree of polarization mode mixing to the optical signal;
   a second stage optically coupled to the first polarization mode mixing element and comprising:
      a second DGD element optically coupled to the first polarization mode mixing element and applying a second DGD to the optical signal; and,
      a first phase compensator optically coupled to the second DGD element to coherently phase compensate for a first residual optical retardation;
   a second polarization mode mixing element optically coupled to the second stage and applying a second degree of polarization mode mixing to the optical signal;
   a third stage optically coupled to the second polarization mode mixing element and comprising:
      a third DGD element optically coupled to the second polarization mode mixing element and applying a third DGD to the optical signal; and,
      a second phase compensator optically coupled to the third DGD element to coherently phase compensate for a second residual optical retardation;
   a third polarization mode mixing element optically coupled to the third stage and applying a third degree of polarization mode mixing to the optical signal; and,
   a fourth stage optically coupled to the third polarization mode mixing element and comprising:
      a fourth DGD element optically coupled to the third polarization mode mixing element and applying a fourth DGD to the optical signal;
   wherein all DGD elements within the series combination are harmonic, and,
   wherein compensated first and second residual optical retardations respectively associated with the second and third stages are substantially the same.

69. The PMD generator of claim 68, further comprising:
   a first mode-mixing controller connected to the first polarization mode mixing element and controlling the first degree of polarization mode mixing applied to the optical signal; and,
   a second mode-mixing controller connected to the second polarization mode mixing element and controlling the second degree of polarization mode mixing applied to the optical signal.

70. The PMD generator of claim 69, wherein the first mode-mixing controller is additionally connected to the third polarization mode mixing element and additionally controls the third degree of polarization mode mixing applied to the optical signal.

71. The PMD generator of claim 68, wherein each one of the first, second, and third polarization mode mixing elements comprises a half-wave waveplate.

72. The PMD generator of claim 68, wherein each one of the first and second phase compensators comprises at least one waveplate.

73. The PMD generator of claim 72, wherein each one of the first and second phase compensators comprises a combination of:
   a first quarter-wave waveplate;
   a half-wave waveplate; and,
   a second quarter-wave waveplate.

74. The PMD generator of claim 73, wherein first and second quarter-wave waveplates are fixed and the half-wave waveplate is rotatable.

75. The PMD generator of claim 68, wherein at least one of the optical couplings between;
   the first stage and the first polarization mode mixing element,
   the first polarization mode mixing element and the second stage,
   the second stage and the second polarization mode mixing element,
   the second polarization mode mixing element and the third stage,
   the third stage and the third polarization mode mixing element,
   the third polarization mode mixing element and the fourth stage, is a free-space optical coupling.

76. A method for generating a coherent polarization mode dispersion ("PMD") spectrum in a PMD generator, the method comprising:

receiving an optical signal in a first stage comprising a first differential group delay ("DGD") element and applying a first DGD to the optical signal;

passing the optical signal from the first stage to a first polarization mode mixing element and applying a first degree of polarization mode mixing to the optical signal;

passing the optical signal from the first polarization mode mixing element to a second stage, the second stage comprising; a second DGD element applying a second DGD to the optical signal, and a first phase compensator phase compensating for a first residual optical retardation;

passing the optical signal from the second stage to a second polarization mode mixing element and applying a second degree of polarization mode mixing to the optical signal;

passing the optical signal from the second polarization mode mixing element to a third stage, the third stage, comprising; a third DGD element applying a third DGD to the optical signal, and a second phase compensator compensating for a second residual optical retardation;

passing the optical signal from the third stage to a third polarization mode mixing element and applying a third degree of polarization mode mixing to the optical signal; and, passing the optical signal from the third polarization mode mixing element to a fourth stage, comprising a fourth DGD element and applying a fourth DGD to the optical signal;

wherein first, second, third, and fourth DGD elements are harmonic, and, wherein compensated first and second residual optical retardations respectively associated with the second and third stages are substantially the same.

* * * * *